United States Patent
Pechenik et al.

(10) Patent No.: US 11,972,436 B2
(45) Date of Patent: *Apr. 30, 2024

(54) METHOD AND SYSTEM FOR COLLECTING AND PARSING MARKET DATA FROM VARIOUS SOURCES

(71) Applicant: ICE Data, LP, Atlanta, GA (US)

(72) Inventors: Jacob E. Pechenik, New York, NY (US); Gregory S. Campbell, Brooklyn, NY (US); Douglas E. Miller, Brooklyn, NY (US); Blake A. Barnes, New York, NY (US); Kevin Kimmel, Hoboken, NJ (US); Todd M. Kenney, Devon, PA (US); Carmelo Piccione, Brooklyn, NY (US); Yasmin Sohrawardy, Woodside, NY (US)

(73) Assignee: ICE Data, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,684

(22) Filed: Apr. 15, 2021

(65) Prior Publication Data
US 2021/0233089 A1 Jul. 29, 2021

Related U.S. Application Data

(63) Continuation of application No. 13/770,452, filed on Feb. 19, 2013, now Pat. No. 11,010,767, which is a
(Continued)

(51) Int. Cl.
*G06Q 30/02* (2023.01)
*G06Q 10/00* (2023.01)
(Continued)

(52) U.S. Cl.
CPC ............. *G06Q 30/00* (2013.01); *G06Q 10/00* (2013.01); *G06Q 10/10* (2013.01);
(Continued)

(58) Field of Classification Search
CPC ........ G06Q 30/00; G06Q 10/10; G06Q 40/06; G06Q 10/00; G06Q 30/0206; G06Q 30/0201
See application file for complete search history.

(56) References Cited

U.S. PATENT DOCUMENTS 5,195,031 A * 3/1993 Ordish .................. G06Q 40/04
705/37
7,162,447 B1 * 1/2007 Cushing ................. G06Q 40/00
705/37
(Continued)

FOREIGN PATENT DOCUMENTS

GB 2 419 694 A 5/2006
WO 03/012588 A2 2/2003

OTHER PUBLICATIONS

"Reuters Order Routing for Commodities" (published by Reuters in 2005 and available online at https://www.theice.com/publicdocs/data/Order_routing_for_commodities.pdf) (Year: 2005).*
(Continued)

*Primary Examiner* — James M Detweiler
(74) *Attorney, Agent, or Firm* — DLA Piper LLP (US)

(57) ABSTRACT

A system comprises at least one computer device in communication with one or more server computers. The system converts unstructured text into usable order details, and uses instant messaging to notify recipients of the order details. The notices include electronic web links that launch a web interface that generates an editable, pre-populated electronic order ticket based on the order details. Submission of the electronic order ticket launches an auction during which the recipients may respond with offers to fulfill to the electronic order ticket. If after the auction more than one response is needed to fill the electronic order ticket, the system automatically allocates how and in which order the responses will be used to fill the electronic order ticket. If the electronic
(Continued)

order ticket is not completely filled after the auction, the electronic order ticket is submitted to one or more additional exchanges for further filling.

28 Claims, 20 Drawing Sheets

Related U.S. Application Data continuation-in-part of application No. 11/961,296, filed on Dec. 20, 2007, now Pat. No. 8,751,403.

(60) Provisional application No. 60/876,212, filed on Dec. 21, 2006.

(51) Int. Cl.
    *G06Q 10/10*     (2023.01)
    *G06Q 30/00*     (2023.01)
    *G06Q 30/0201*     (2023.01)
    *G06Q 40/06*     (2012.01)

(52) U.S. Cl.
    CPC ..... *G06Q 30/0201* (2013.01); *G06Q 30/0206* (2013.01); *G06Q 40/06* (2013.01)

(56) References Cited

U.S. PATENT DOCUMENTS

| | | | |
|---|---|---|---|
| 7,542,938 B1* | 6/2009 | Tam | G06Q 40/04 705/37 |
| 7,685,083 B2 | 3/2010 | Fairweather | |
| 2001/0044771 A1 | 11/2001 | Usher et al. | |
| 2001/0049651 A1 | 12/2001 | Selleck | |
| 2002/0023045 A1* | 2/2002 | Feilbogen | G06Q 40/04 705/37 |
| 2002/0112171 A1 | 8/2002 | Ginter et al. | |
| 2002/0133453 A1* | 9/2002 | Rose | G06Q 40/04 705/37 |
| 2002/0161693 A1 | 10/2002 | Greenwald | |
| 2002/0184237 A1* | 12/2002 | McFeely | G06Q 10/10 |
| 2003/0028468 A1 | 2/2003 | Wong et al. | |
| 2003/0061149 A1* | 3/2003 | Ajitsaria | H04L 9/40 705/37 |
| 2003/0097325 A1 | 5/2003 | Friesen et al. | |
| 2004/0193442 A1 | 9/2004 | Kimata et al. | |
| 2005/0049955 A1* | 3/2005 | Kohnhorst | G06Q 40/04 705/37 |
| 2005/0066002 A1 | 3/2005 | Teres et al. | |
| 2005/0182756 A1 | 8/2005 | Eppley et al. | |
| 2006/0015432 A1 | 1/2006 | Minaguchi et al. | |
| 2006/0026091 A1* | 2/2006 | Keen, Jr. | G06Q 40/04 705/37 |
| 2006/0080214 A1 | 4/2006 | Hausman et al. | |
| 2006/0156222 A1 | 7/2006 | Chi et al. | |
| 2006/0229955 A1 | 10/2006 | Ono et al. | |
| 2007/0022037 A1 | 1/2007 | Pechenik et al. | |
| 2007/0050280 A1 | 3/2007 | Madle et al. | |
| 2007/0118455 A1 | 5/2007 | Albert et al. | |
| 2007/0219901 A1* | 9/2007 | Garbow | G06Q 30/06 705/39 |
| 2007/0288658 A1 | 12/2007 | Lam et al. | |
| 2008/0162173 A1* | 7/2008 | Pechenik | G06Q 30/0206 705/52 |
| 2008/0215477 A1* | 9/2008 | Annunziata | G06Q 40/04 705/37 |
| 2010/0082755 A1* | 4/2010 | Bryan | G06F 9/451 709/206 |
| 2011/0238557 A1 | 9/2011 | Barry | |

OTHER PUBLICATIONS

Office Action dated May 1, 2014 for counterpart Canadian Application No. 2,645,004.

Canadian Office Action dated Sep. 21, 2015 for counterpart Canadian Application No. 2,843,458.

\* cited by examiner

| | Quote Console - YJ Energy | | | | | |
|---|---|---|---|---|---|---|
| 10:26:35 AIM Contact: hello | | | | | | |
| 10:28:54 AIM Contact: h 1200 puts crossing 1050 20@25 | | | | | | |
| | PT (t) | KILL (k) | MATCH (m) | DELETE | | |
| | Update | Product | Bid Contact | Bid | Offer | Offer |
| ▶ | 10:26AM | h07 12:00 puts vs 10.50 | AIM Contact | 0.2000 | 0.2500 | AIM |
| h 15 calls | | 12 | @ | 16 | gcamp ▼ | SAVE |

Quote Console - YJ Energy

[ PT (t) ] [ KILL (k) ] [ MATCH (m) ] [ DELETE ] [ UNLOCK ]

| Update | Product | Bid Contact | Bid | Offer | Offer Contact | Last | P | My Bid | K | My Offer | MyPrice | Theoretic... | Implied... | De |
|---|---|---|---|---|---|---|---|---|---|---|---|---|---|---|
| 11:48AM | x07-h08 1.00 calls live | buyer:undefined | | | seller:undefined | notify:nobody | 8.7181 | T | | | | | 8.7181 | 10.21 | 0.0 |

☐ x07-h08 1.00 calls live trades at 8.7181

| B/S | Product | | | | | Size | Premiu... | Implied... | 100 | copy-B | copy-S | Port | Cancel | | |
|---|---|---|---|---|---|---|---|---|---|---|---|---|---|---|---|
| | | | | | | | | | Delta | Gamma | Vega | Theta | | | |
| B | LN X7 1c | | | | | 100 | 7.5516 | 0.0891 | 0.0095 | 0.0000 | 0.0000 | 0.0010 | | | |
| B | LN Z7 1c | | | | | 100 | 8.2564 | 0.0968 | 0.0095 | 0.0000 | 0.0000 | 0.0011 | | | |
| B | LN F8 1c | | | | | 100 | 8.9824 | 0.1048 | 0.0095 | 0.0000 | 0.0000 | 0.0012 | | | |
| B | LN G8 1c | | | | | 100 | 9.4153 | 0.1038 | 0.0094 | 0.0000 | 0.0000 | 0.0012 | | | |
| B | LN H8 1c | | | | | 100 | 9.3845 | 0.1099 | 0.0094 | 0.0000 | 0.0000 | 0.0012 | | | | x7h 100 calls   [ 20 ] [ @ 30 ] [ dmiller ▼ ] [ SAVE ]   [ FIND ] [ CLEAR ]

METHOD AND SYSTEM FOR COLLECTING AND PARSING MARKET DATA FROM VARIOUS SOURCES

BACKGROUND

The present disclosure generally relates to a system for trading and analyzing derivative products, and more particularly, software that aggregates, organizes, parses and extracts market data for trading information from trading networks.

Derivatives can be traded either on an exchange or off-exchange. Derivatives traded on an exchange are called exchange-traded derivatives. The primary purpose of exchanges is to provide contract standardization, anonymity, a clearing system, price transparency and a large number of participants in order to provide liquidity in a contract.

Derivative contracts entered into through private negotiations are typically called off-exchange or OTC derivatives. OTC contracts allow the creation of products whose risk-return characteristics closely match the needs of individual customers. Additionally, the nature of private, non-transparent markets addresses privacy concerns when participants do not want the terms of their trade or prospective trade advertised to the broader market.

Notably, a significant amount of the business transactions involving derivative contracts, and options in particular, is negotiated and consummated through voice brokers, away from computerized and electronic trading environments. This is typically the case because such transactions involve complex financial instruments (e.g., packages of products, spreads, etc.) which are not listed on electronic exchanges, for example, and/or because they involve large (atypical) trading quantities for which the electronic trading environment provides little or no liquidity. Indeed, most (if not all) of the liquidity in the institutional market for complex derivative contracts and options exists in the voice broker market, as opposed to electronic trading environments.

Conventional methods of communicating indications of interest and/or pricing information related to derivative contracts in the voice broker market include voice communications (i.e., via telephone) and via instant messenger (IM). Increasingly, IM is becoming the preferred method for such communications because, for example, brokers are able to receive and access multiple IM's simultaneously, and transmitting any information via IM creates a written record that may be accessed at a later time, if necessary.

Although IM technology has, in general, enhanced the workflow and communications between traders and brokers of derivative instruments (in the voice broker market), there are still significant deficiencies in existing electronic trading systems preventing the use of such IM technology in electronic markets, for example.

For one, conventional IM communications include unstructured text (i.e., textual information that does not comply with or follow any particular order, sequence or syntax). As a result, conventional electronic trading systems are unable to automatically process and extract any relevant information included in such text.

Further, even if the IM communications were structured (i.e., organized according to a certain sequence and format) such that a particular system could identify relevant information based on its position within a particular IM text, such information could not be leveraged by other systems that may utilize a different IM sequence or format.

Accordingly, there is a need for methods and apparatus configured to recognize, parse and extract relevant information from unstructured IM text, and convert the unstructured text into structured data that can be easily organized and presented to users for viewing, comparing, analyzing, etc.

There is also a need for methods and apparatus configured to convert the unstructured text (after being parsed from unstructured text) into a format that can easily be processed by and integrated with all types of electronic systems and modules (e.g., order management systems, electronic exchanges, risk systems, pricing models, etc.).

SUMMARY

An exemplary embodiment of the present disclosure includes a system comprising at least one computer device in communication with one or more server computers. The computer device includes a user interface configured to receive unstructured text generated by a user, the unstructured text comprising structures and quotes on structures, each structure comprising one or more component parts. The server computers include at least one of an instant messaging gateway that enables the computer devices to communicate with each other and with the server computers via instant messaging and a market data recognition module that recognizes the structures and quotes in the unstructured text and converts the unstructured text into an editable electronic order ticket that is pre-populated with data and information representing the structures and quotes.

In one embodiment, instant messaging may be used to generate and transmit a notice to one or more recipients associated with one or more exchanges, said notice informing the recipients that an electronic order ticket has been submitted to the one or more exchanges for fulfillment. The instant messages may include an electronic web link configured to launch a web interface that includes the electronic order ticket and all of its order details. Submission of the electronic order ticket may launch an auction during which the recipients may respond with offers to fulfill to the electronic order ticket. If after the auction more than one response is needed to fully satisfy the electronic order ticket, the system automatically allocates how and in which order the responses will be used to fulfill the electronic order ticket. If the electronic order ticket is not completely fulfilled after the auction, the electronic order ticket may be submitted to one or more additional exchanges for further fulfillment. In one embodiment, the initiator of the order ticket can select one or more preferred exchanges to which the electronic order ticket will be submitted. In another embodiment, the system automatically selects the exchanges.

BRIEF DESCRIPTION OF THE DRAWINGS

Various exemplary embodiments of the present disclosure will be described in detail, with reference to the following figures, wherein:

FIG. 5 is a screen shot of the structured data shown parsed in FIG. 3B being entered into a quote console according to an embodiment;

FIG. 13 illustrates the interaction of the quote console of FIG. 5 with a pricing service according to an exemplary embodiment;

FIG. 16 illustrates a Quote Console, according to an exemplary embodiment with a "direct send" button highlighted;

FIG. 18 illustrates a Quote Console, according to an exemplary embodiment with a "kill' button highlighted;

FIG. 21 illustrates an inline alert in a Quote Console, according to an exemplary embodiment.

DETAILED DESCRIPTION

The various exemplary embodiments of the present disclosure are directed to a virtual over-the-counter exchange system which allows users, or systems on behalf of users, to input product data to a virtual database where the data is standardized, distribution is automated and the organization and display of the OTC market data is in a secure and compliant environment.

The present disclosure provides technology that allows for efficient information exchange for decentralized markets without disrupting existing workflows or interfering with existing relationships.

Figure 1:
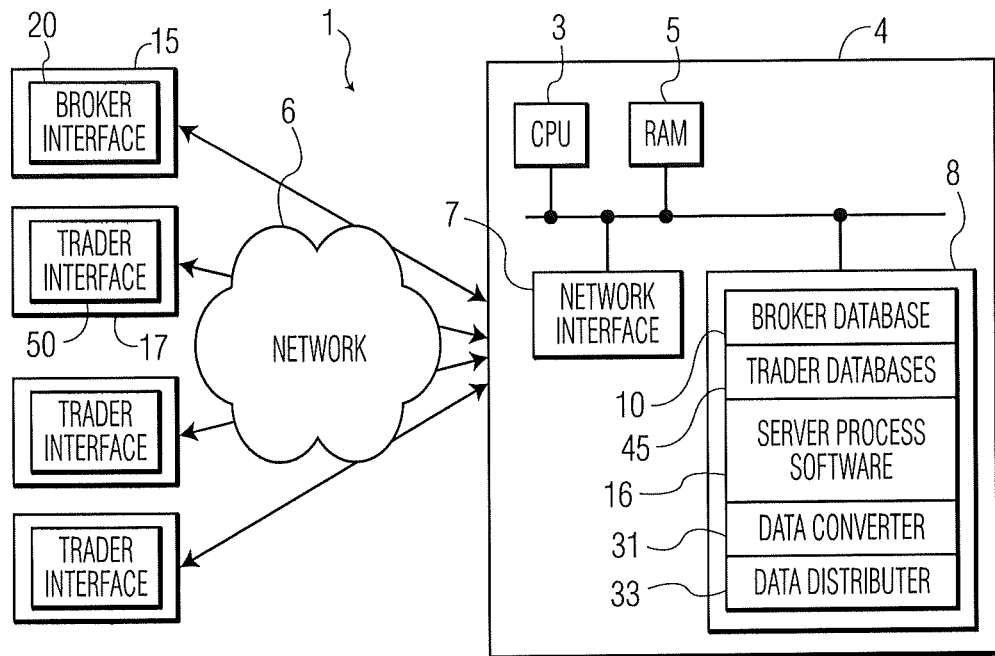
FIG. 1 shows a computer based system for establishing a virtual over-the-counter exchange according to an exemplary embodiment of the present disclosure.
Figure 2:
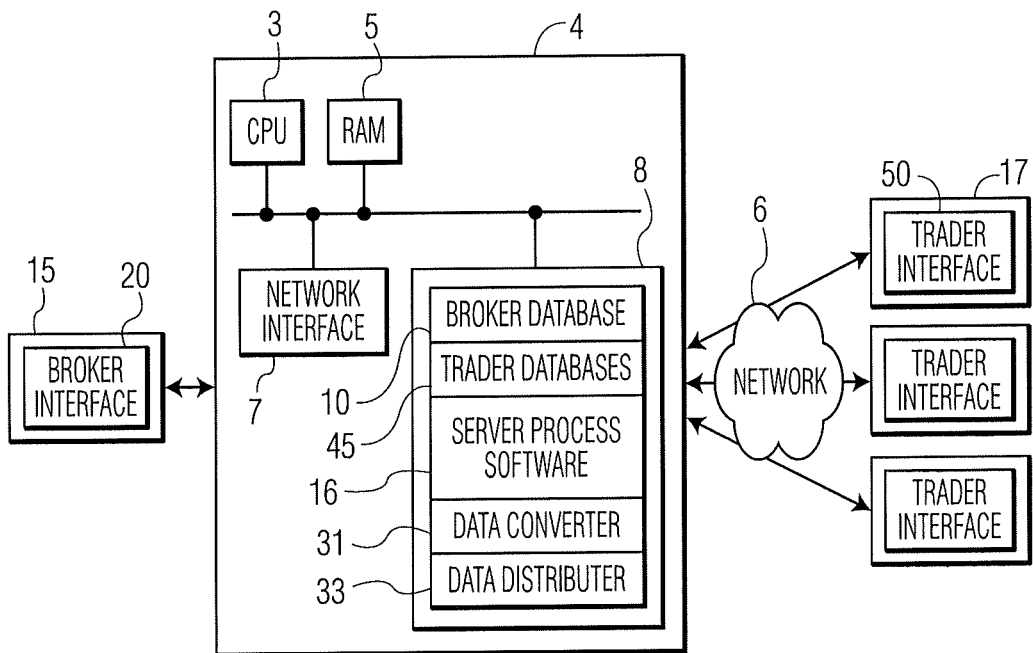
FIG. 2 shows a computer based system for establishing a virtual over-the-counter exchange according to another exemplary embodiment of the present disclosure.

FIG. 1 shows a computer based system 1 for establishing a virtual OTC exchange according to an exemplary embodiment of the disclosure. The system 1 in this embodiment includes a user computer 15 and a plurality of other user computers 17 used to communicate with user computer 15 are connected to a server computer 4 over a wide area network 6, such, for example, the Internet. It should be appreciated that in other embodiments of the present disclosure, the computer based system 1 may include any number of user computers. In an exemplary embodiment of the present disclosure, when a user at computer 15 or 17 (as shown in FIG. 2) logs into server computer 4 using login information, server computer 4 is able to determine whether to send information based on the login information. Server computer 4 includes a central processing unit (CPU) 3, a primary memory (i.e., RAM) 5, a network interface 7, and a secondary memory (not shown). Secondary memory is preferably disk storage. Code is stored in secondary memory for performing a plurality of processes, executable by the CPU 3, which function together to establish a virtual exchange for OTC traded derivatives, such as, for example, weather or natural gas derivatives. Alternatively, each of the processes may run on a separate hardware element of server computer 4. Alternatively, each of the processes may also be load balanced across multiple server computers for scalability and fault tolerance. As will be explained in further detail below, computers 15 and 17 may be located at, but are not limited to, brokerage houses or trader workstations, where broker and/or trader whiteboards are displayed for easy viewing and manipulation of financial product data.

As shown in FIG. 2, in an alternative embodiment of the disclosure, a plurality of user computers 17 are connected via a wide area network (WAN). The server computer 4 is local to another user computer 15, and information may be exchanged between user computers 15 and 17 over a wide area network 6, such as, for example, the Internet. Alternatively, server computer 4 may be local to user computer 17, and user computer 15 may communicate with server computer 4 over the Internet. In either embodiment, server computer 4 may provide an instant messaging gateway, which allows users of computers 15 and 17 to communicate with one another via instant messaging, such as, for example, AOL Instant Messenger, Yahoo! Messenger and Jabber. In either embodiment, server computer 4 may represent a cluster of server computers with processes distributed among the hardware elements.

Stored in the secondary memory 8 are one or more of a plurality of virtual user databases 10 and server process software 16. In one embodiment, each user has its own virtual database. Each virtual database may contain data published to it from any other user, both on and off the system, both directly from a source virtual database, and from other inputs and sources. The server process software 16 contains logic to receive requests, commit received data and distribute data to and from the databases and the user computers.

Each user database 10 may include "master" information relating to, for example, each trader/broker counterparty, each derivative structure listed, quotes on all structures, a history of bid and/or offer and trade updates for each structure, specific details on user relationships, and preferred format of quotes when sent in string format to a particular counterparty. A "structure" is an OTC contract description, for example, a call spread, straddle, strangle or any other type of OTC contract type. If the user is in a group, virtual database 10 may be shared by a group of users. Virtual database 10 may also be located at the user's site in certain configurations. In general, virtual database 10 preferably contains historical information. A user may use this information to determine where to send information regarding a structure and how the information is to be transferred. Information comes directly from the server and is published for its users.

Database 10 may contain data that may be analyzed and re-purposed to provide insight into preferences and behavior. This data may be used to automatically associate users with structures that they are likely to be interested in based on previous activity. Both database 10 and database 45 store financial structure and quote data information in a standard format, preferably one from which customized text-based quotes may easily be created. The data string representing each of the financial structures may be distributed as financial structure information updates and quotes via instant messaging or e-mail, for example.

The server process software 16 may include a data converter 31 and a data distributor 33. Data converter 31 contains logic to translate financial product information received from any interface 20 into a standard data protocol for storage in the virtual database 10. In this regard, the data converter is preferably an application program interface (API) which allows for communication between user computers 15 and server computer 4 by providing a number of server controllers. Thus, any suitable interface 20 may be used to interact with the server software as long as it is configured to the requirements of the API. The data distributor 33 distributes financial structure information stored in database 45 to a corresponding one of the plurality of interfaces 50 in one of a plurality of proprietary formats. For example, user interface 50 may be an e-mail system, in which case the data distributor 33 would translate the data stored in virtual database 45 into text for sending and using SMTP protocol. The previously mentioned API is preferably used for communication between any type of interface system and the server computer 4. The data distributor 33 also determines whether the user is available to receive financial structure information either through a proprietary graphical interface, or via any other type of communications means, such as instant messaging or e-mail, and determines the proper data protocol for distribution based on the user's availability. Interface 50 may include any suitable communication means, as long as such means is configured to the requirements of the previously mentioned API.

Graphical interface 20 retrieves data from and sends data to virtual database 10 and displays information regarding financial products at computer 15. Interface 20 allows users to create structures, manage quotes, disseminate quotes, analyze quotes and price structures, trade, and communicate with individuals or groups over secure, logged instant messaging. In one embodiment of the present disclosure, interface 20 may be a graphical interface.

Figure 3A:
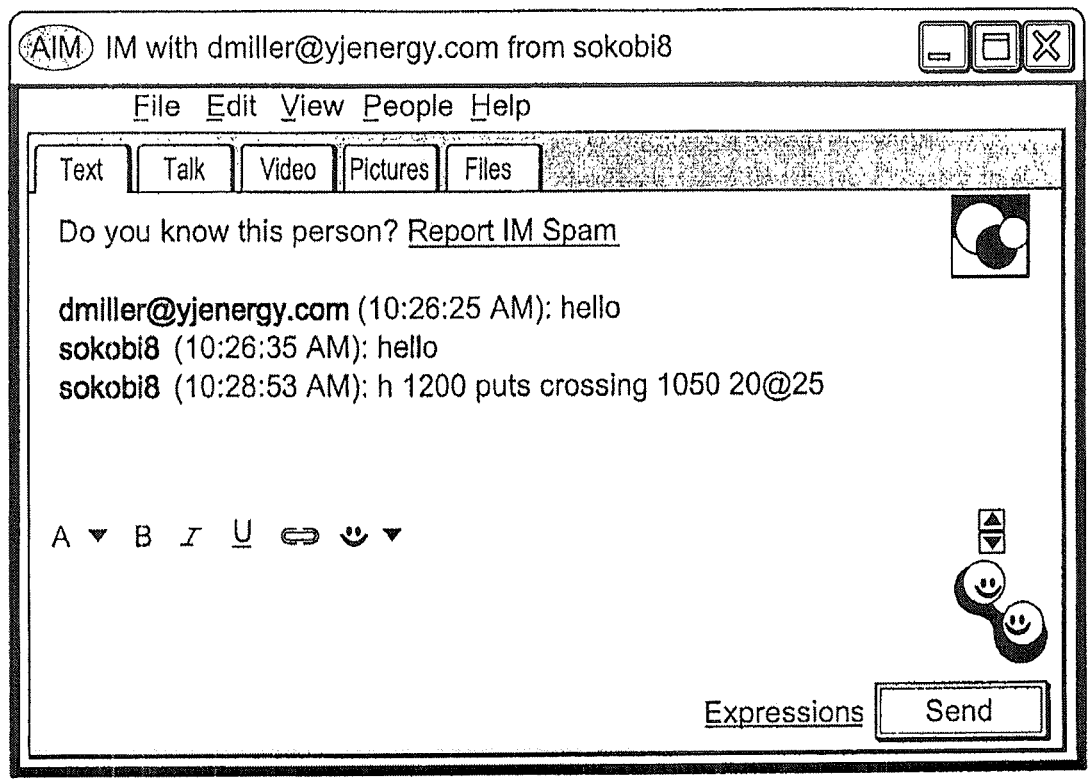
FIGS. 3A AND 3B are screen shots of unstructured text parsed into structured data and text according to an exemplary embodiment of the present disclosure.
Figure 3B:
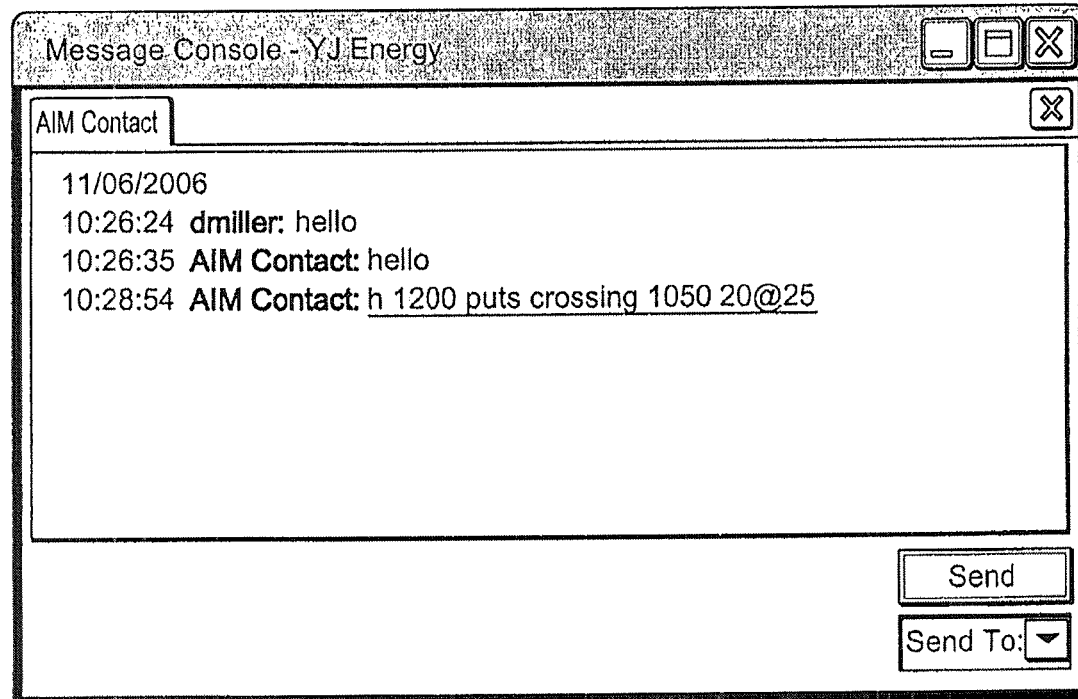

As shown in FIGS. 3A and 3B, the present disclosure provides quotes to its users. In this example, unstructured text is entered into an IM screen. The unstructured text is sent to a user in the form of a text or instant message from a non-user. The unstructured text message is then parsed and a quote on a structure is recognized and highlighted, as can be seen in FIGS. 3A and 3B.

One method the present disclosure uses to recognize and highlight data is by its market data recognition (MDR) feature. The MDR can recognize structures and quotes on structures in chat messages received from a non-user, and structures and quotes on structures from a user's sent chat messages. In addition, structures and quotes on structures generated from a user's quote console can be recognized by the MDR and converted into an electronic order ticket or a web link to an electronic order ticket (discussed further below). The MDR is also capable of recognizing incoming and outgoing quote messages between users and non-users. This feature converts unstructured text into usable quotes. Virtually any process may be used to convert the text into structures and quotes on structures.

The MDR also has the ability to recognize bids and offers. The MDR will associate a recognized bid and/or offer with a user's set of quotes on a structure based on the counterparty contact's updated history and/or activity. The collection of quotes for the structure may automatically be updated with any recognized incoming or outgoing bids and/or offers, according to a user's preferences. All structure data is normalized and correlated with existing structure data. Thus, multiple quotes associated with the same structure can be associated for display or other purposes. In addition, the MDR provides for an inline chat message capability to add a quote to a structure. A string of unstructured data is paired with contextual information, such as the identity and preferences of the sender and receiver, and is given to an identifying component. The identifying component may use the contextual information to configure its operation or set default behaviors and settings. For example, if the sender typically sends quotes for derivatives on a particular underlying asset, an identifier may use the default underlying asset while parsing the string from that sender if no underlying asset is indicated. If the component accepts the string, it pulls the structure and quote data out of the string and creates an identifying object. The identifying object consists of the matching substring and structure, and any quote and trade information associated with that structure by the string. The default implementation of the identifier component is a composite of implementations of the same interface, such that when the string is passed through an ordered chain of identifier components, each identifier either accepts or rejects the string. If an identifier accepts the string, then the processing stops. When the identifier accepts the string, it pulls the product data out of the string and creates an identifier object, which is returned by the encompassing identifier implementation. Each identifier is associated with an ordered list of expressions that conform to an interface identified by the identifier. Essentially, the identifiers extract a given set of information tagged by a given set of names. The string is passed through the list of expressions, in order, until one of the expressions matches. The identifier extracts the information and creates an identifier object. Expressions are defined using a multi-level expression template library which makes the creation of new patterns very easy. Also, there is a framework for identifying strings that should have been parsed. An identifier may also consist of a hierarchy of expressions such that parents can parse some parts of the string and delegate the parsing of other parts to child expressions.

Once the MDR has converted unstructured text to a structure and quote any number of processes may be performed on the resulting structure and quote. An example of one such real-time process is customizable and configurable alerts. Alerts can notify the user of any number of conditions that may or may not be present in the newly created structure and quote. For example, in an embodiment of the present disclosure, the user may configure an alert to notify himself/herself when a recognized bid is above the theoretical price generated by the Pricing Service Integration (PSI) component (described below) or when a recognized offer is below the theoretical price generated by the PSI. Other alerts could be created from this framework including, but not limited to, alerts to certain product types, certain structures, certain financial characteristics of structures, and certain movements in the bid/ask. For example, in an embodiment, the alert may comprise an electronic notice transmitted in the form of an instant message. This notice may include a selectable web link that when selected is configured to launch an exchange interface that includes an electronic order ticket. Recipients of this notice may then modify order details of the electronic order ticket for submission to the initiator of the electronic order ticket.

Figure 20:
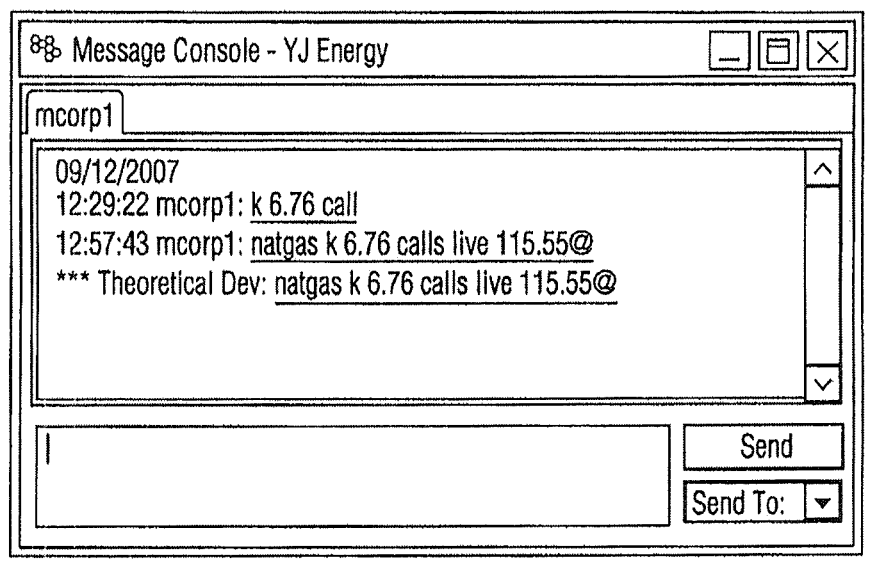
FIG. 20 illustrates an inline alert in the Message Console, according to an exemplary embodiment.
Figure 21:
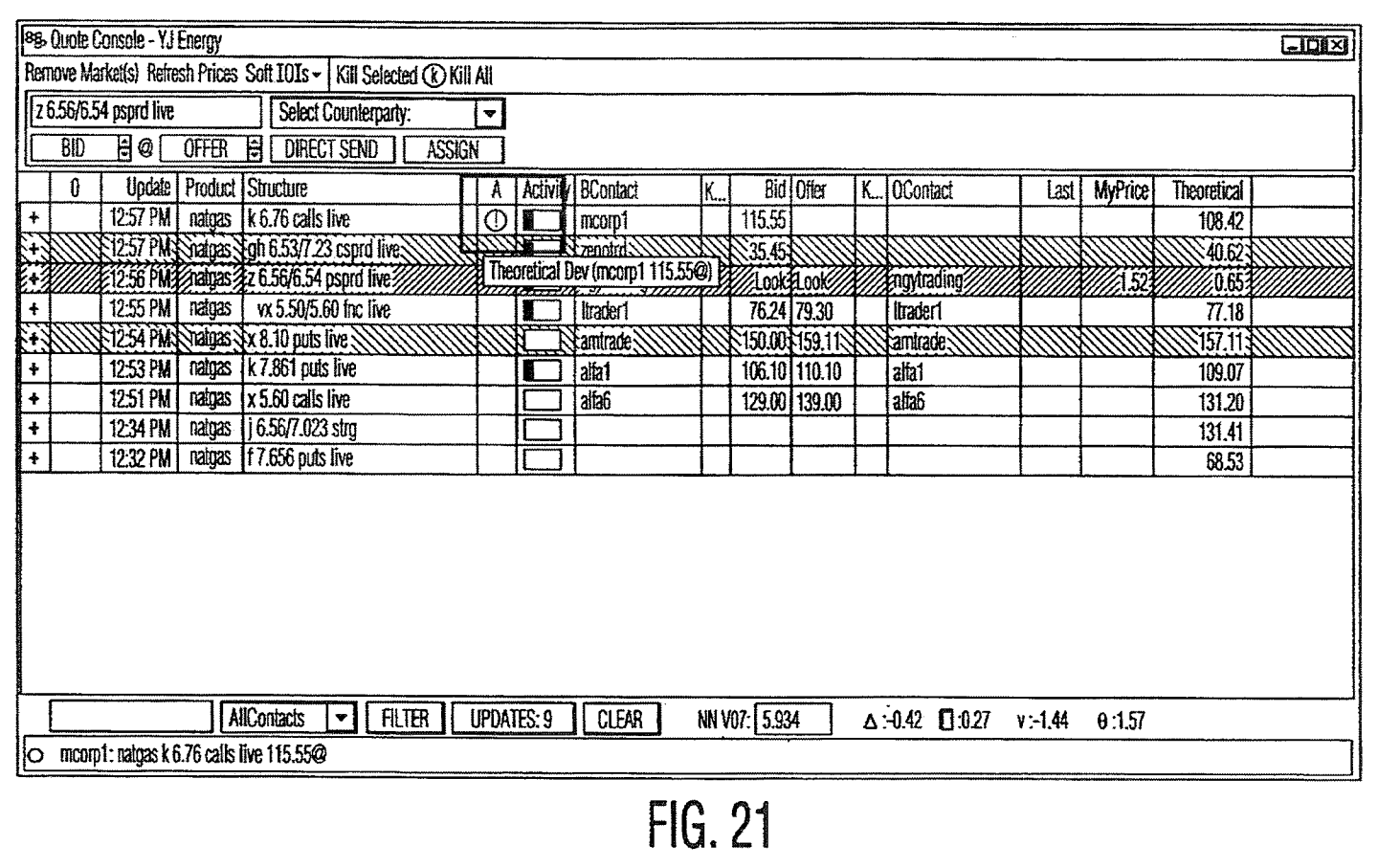

In an embodiment, these alerts are presented to the user in three forms: directly inline in the Message Console, in the Activity Log (discussed below) and through icons in Quote Console. The user can "click" an alert in the Message Console to open the Quote Console and jump directly to the structure in question. FIG. 20 shows an alert inline in the Message Console and FIG. 21 shows an alert icon in the Quote Console.

The MDR includes a set of identifying components, which comprise of a library of identifying components. Because the format of instant messages may vary from market participant to market participant, because additional commodity types with additional conventions for describing market data are introduced, and because conventions for existing commodity types may change over time, it is beneficial for the library to be maintained.

The system includes a process for maintaining this library of components. The system and process comprise of a method for flagging strings that contain market data but which cannot be accurately parsed, and a set of authoring tools that allow component authors to rapidly add and modify library components. In the default implementation of each, composite identifiers may be augmented to compose additional subcomponents, and subcomponents may be authored that conform to pre-existing interfaces. If new types of data need to be extracted, new types of interfaces may be created. In the default implementation, users are able to easily flag a string that contains quote information but which was not parsed using the quote console.

Figure 4A:
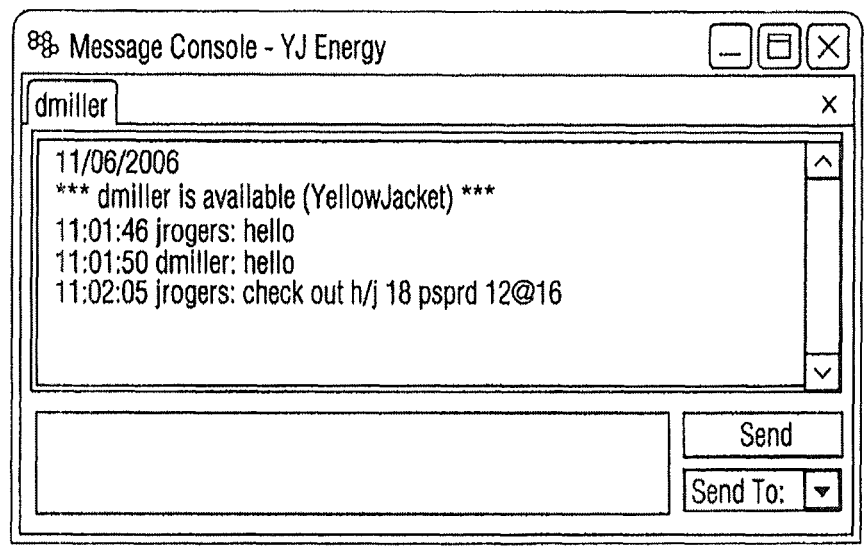
FIGS. 4A and 4B show another feature of unstructured text parsed into structured data and text according to an exemplary embodiment.
Figure 4B:
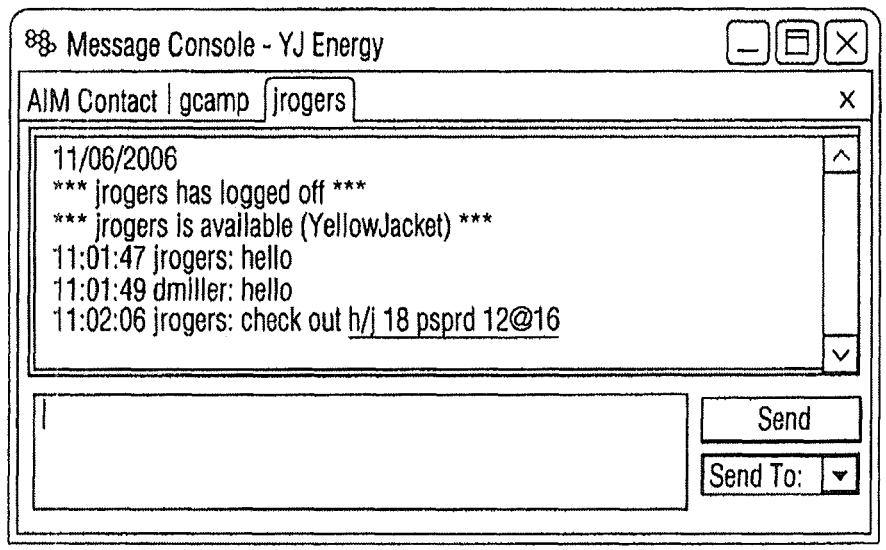

In FIGS. 4A and 4B, an example of a user's interactions are shown. In one embodiment, a user sends a message and a recognized quote is displayed. The quote is recognized and sent to the Market Data Bus of the sender. If the receiver is a user, then the market would also be sent to the Market Data Bus of the receiver.

According to the present disclosure, the market data bus includes components that act as market data providers and/or market data consumers. All market data that enters the bus may be consumed by other components. Among other providers and consumers, some market data providers and consumers include Market Data Recognition for parsing of unstructured text, incoming market data feed from the network of other users and publishers, quote console, pricing service integration, and several other plug-ins.

FIG. 5 illustrates an example of a quote being entered into a quote console. Among other things, a quote may be entered into a quote console. The quote console includes the ability to filter, to display structure components inline, to display quote depth inline, to enter firm or indicative quotes, and to generate instant messages from quote console activity. Other embodiments of the present disclosure may have a quote console with different features.

As described above, the MDR feature can convert unstructured text into normalized, structured quotes that are correlated with existing structure and quote data. Similar to how the MDR feature may convert unstructured text to structure and quote data, various user interface components of the present disclosure may convert the aforementioned structure and quote data back into unstructured (but normalized) text. This unstructured, normalized text may then be sent to the user's Market Data Bus for delivery to any number of recipients in any number of formats including instant messaging (IM) or electronic mail (email).

Figure 16:
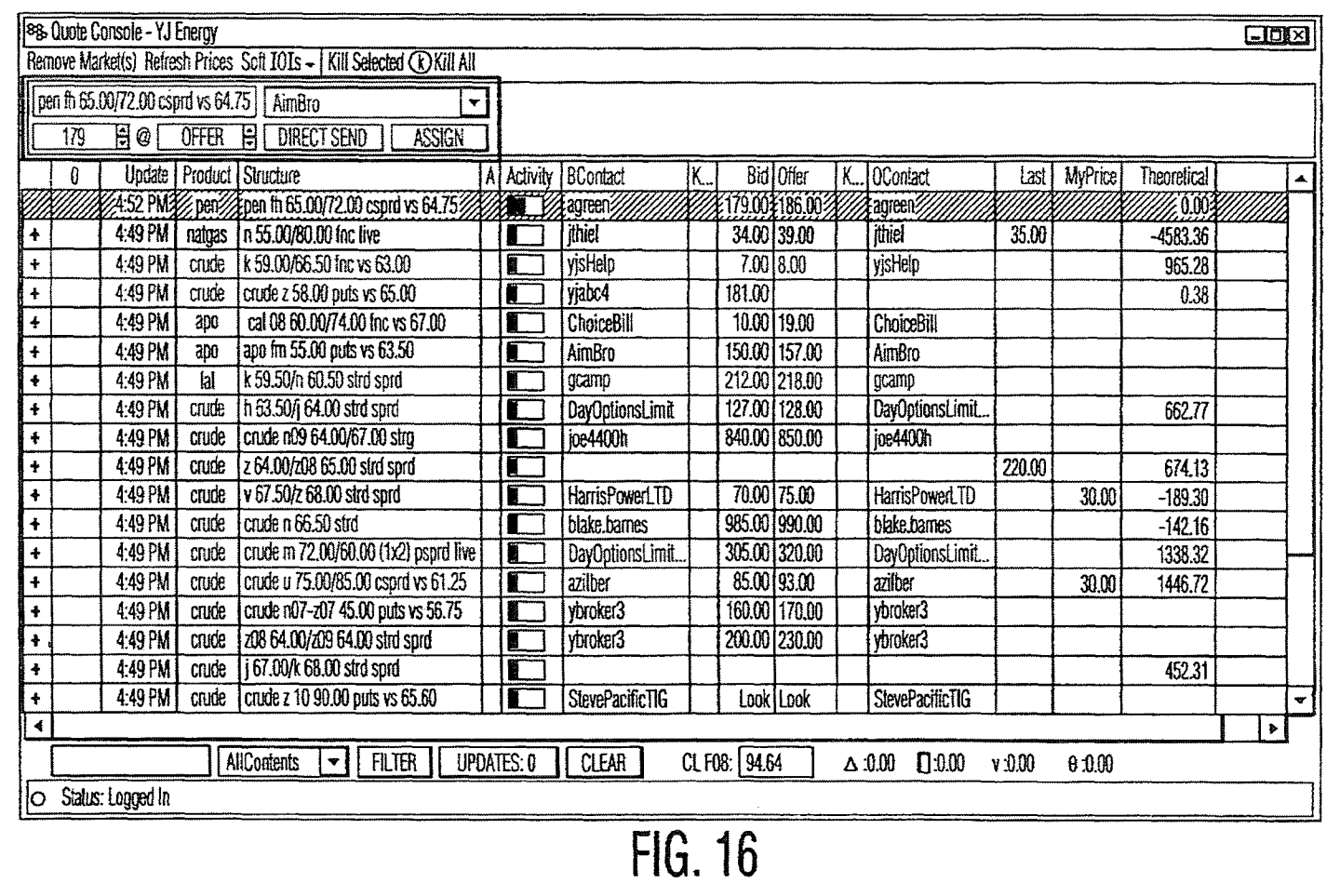
Figure 17:
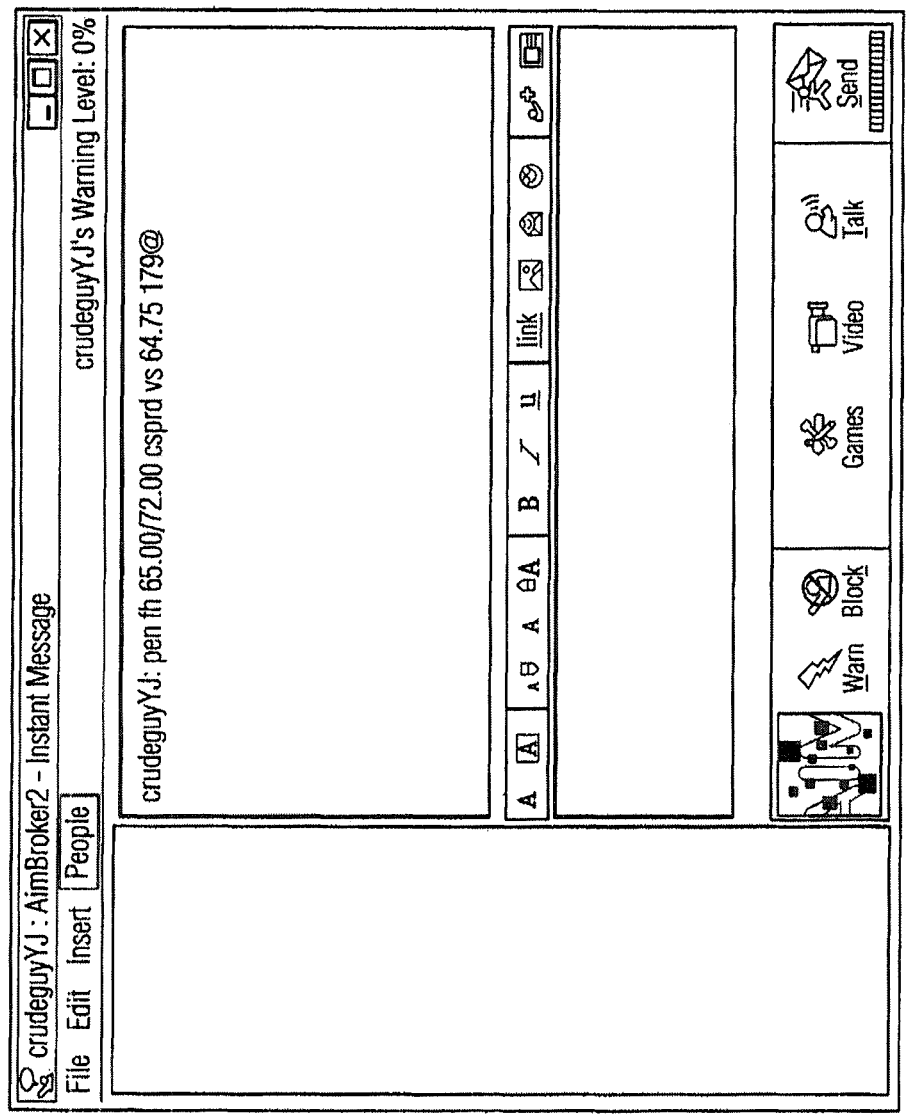
FIG. 17 illustrates a normalized message being sent to a non-user after pressing a "direct send" button in a Quote Console.
Figure 18:
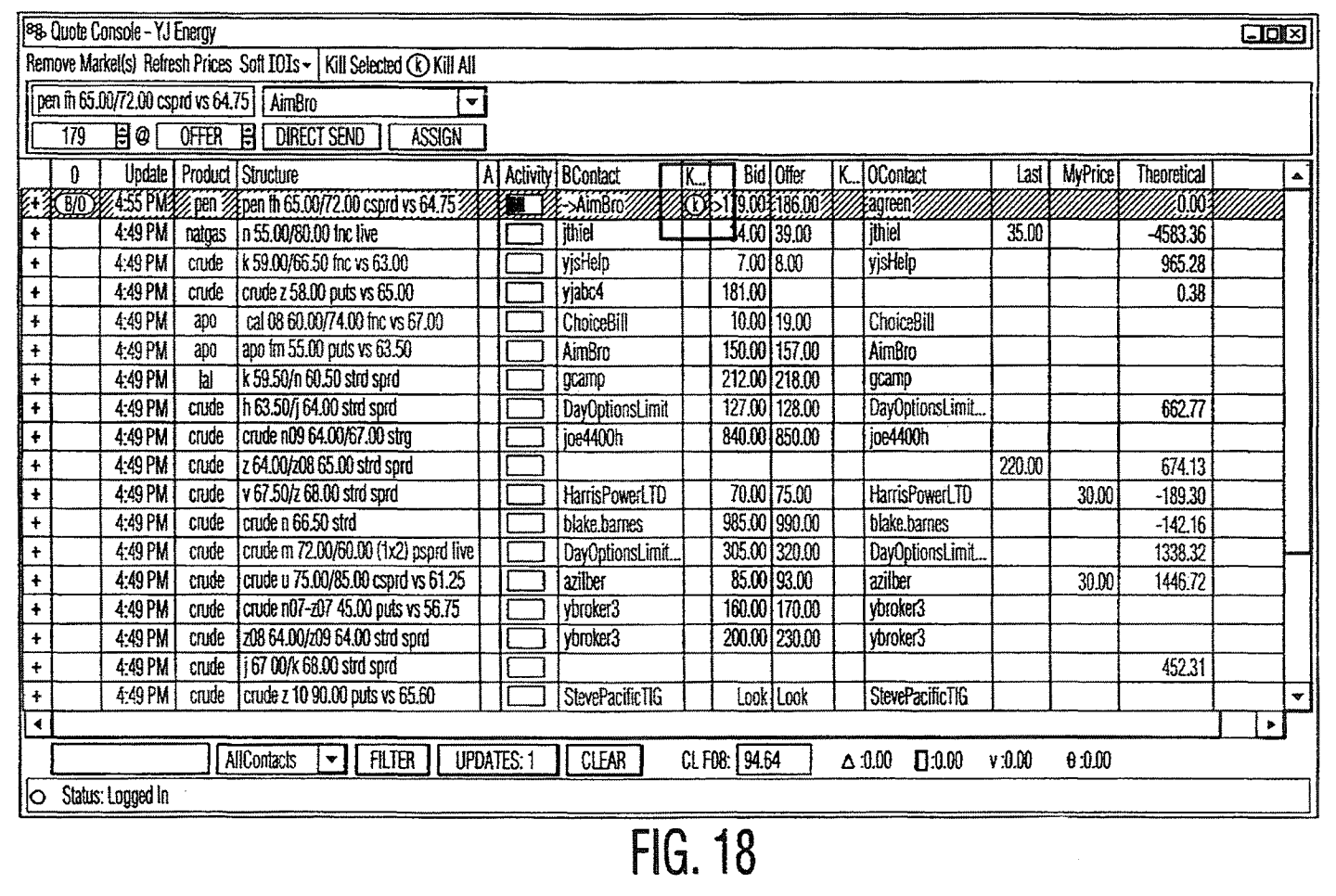
Figure 19:
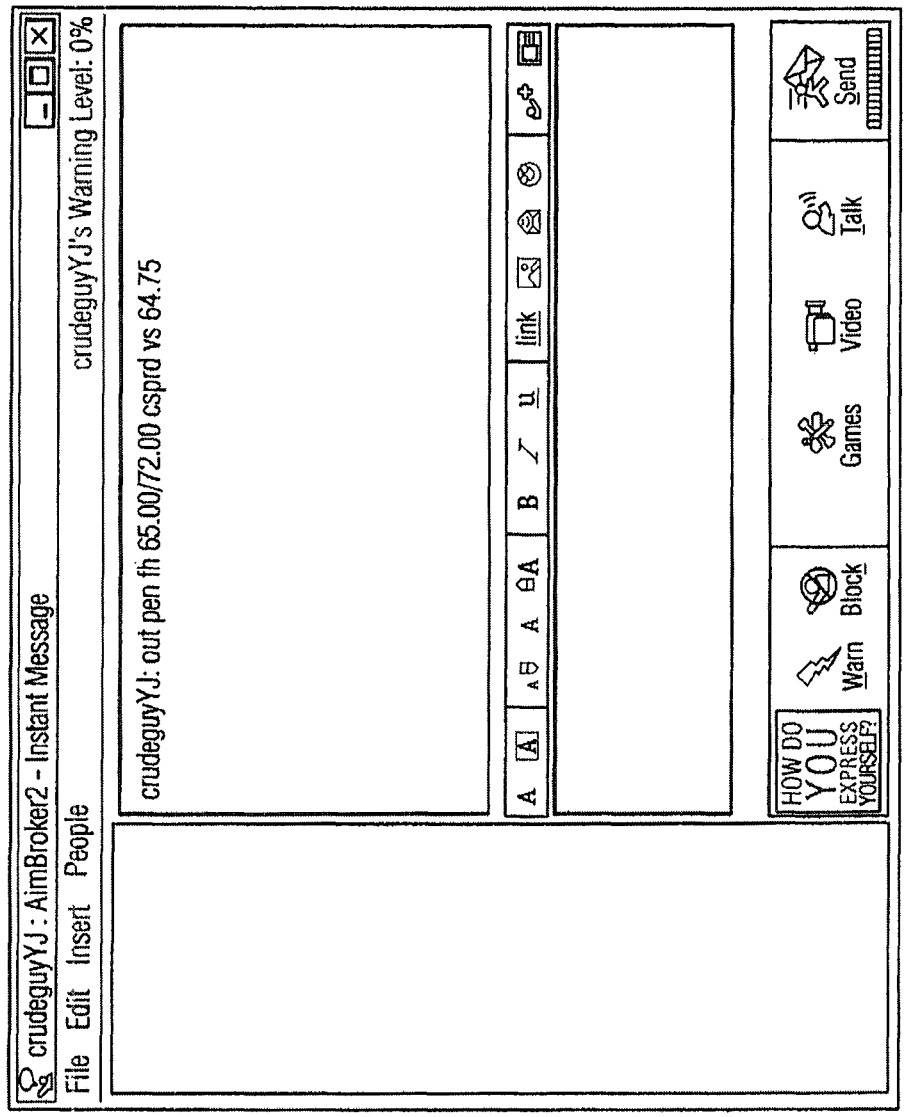
FIG. 19 illustrates an unstructured normalized message being sent to a non-user after pressing a "kill" button in a Quote Console, according to an exemplary embodiment.

One such user interface component is a Quote Console feature. The user may generate an unstructured, normalized text representation of any structure by clicking a line item in the Quote Console, entering a bid/offer (or both), selecting a recipient and pressing the "Direct Send" button. FIG. 16 and FIG. 17 show an example of an unstructured, normalized message being generated. This approach may increase the user's efficiency. For example, to remove a quote previously sent to a counterparty, a user may simply press the "K" button as detailed in FIG. 18 and FIG. 19. Pressing the "K" button, for example, will send a message to the user's Market Data Bus. The Market Data Bus will determine if the recipient is a user or a non-user. If the recipient is a user, then the message will be delivered to the recipient's Market Data Bus for processing. If the recipient is a non-user, then an unstructured, normalized text representation of the message will be generated and delivered to the recipient via any number of formats including IM or email—in this example pressing the "K" button has generated the IM "out pen fh 65.00/72.00 csprd vs 64.75" to non-user AIMBroker2.

Figure 6:
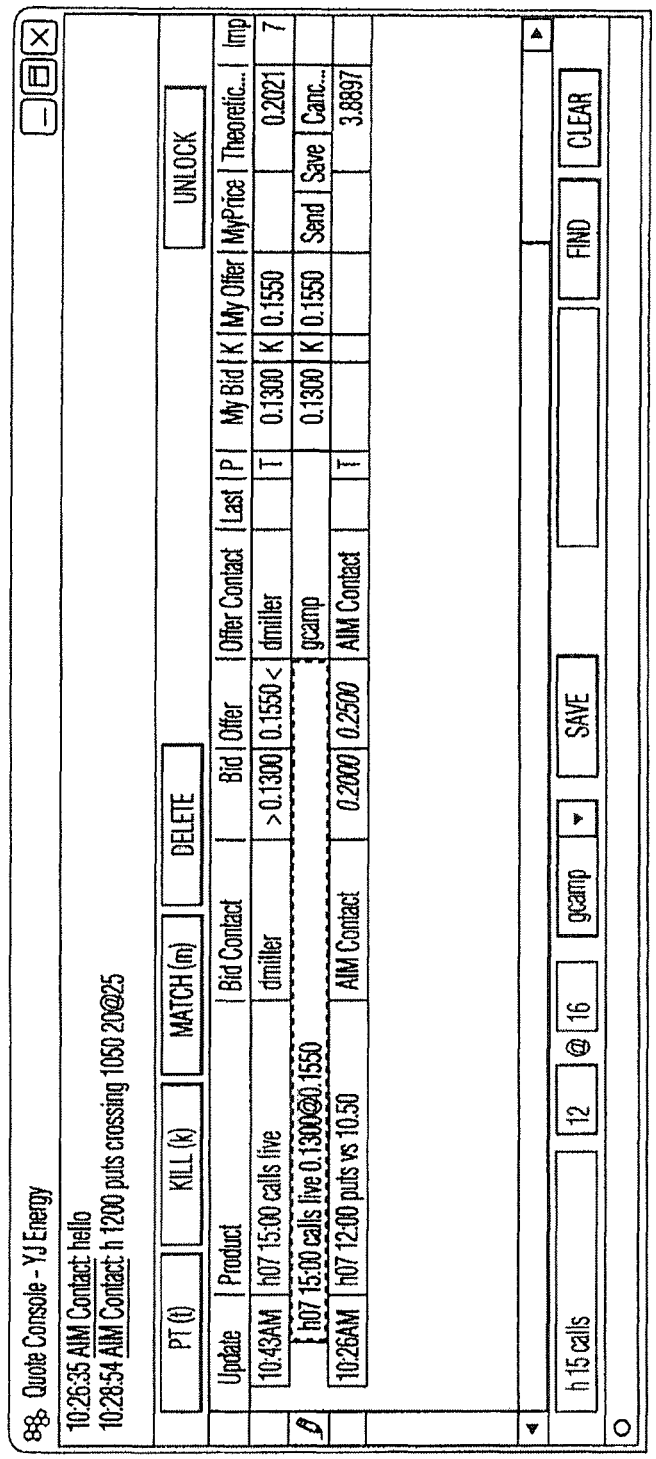
FIG. 6 is a screen shot of the quote console of FIG. 5 being used to enter bid and offer information according to an embodiment.
Figure 7:
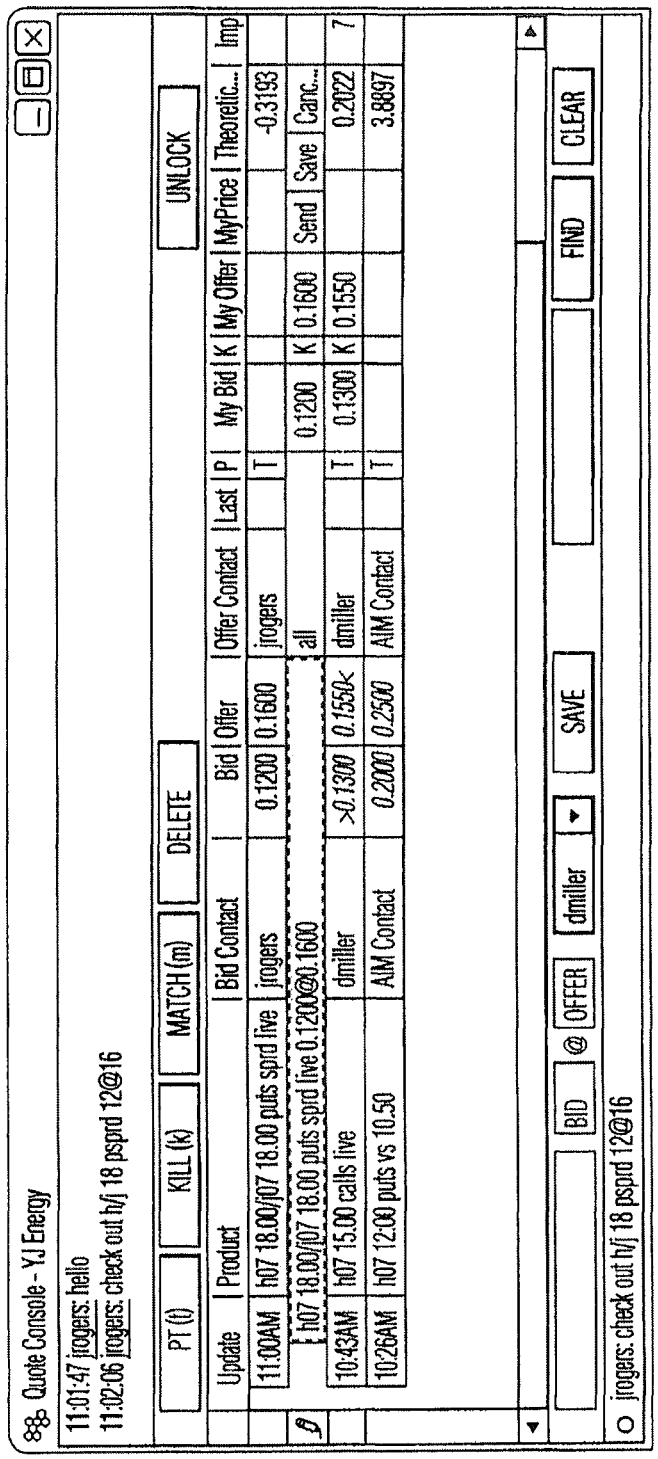
FIG. 7 is a screen shot of a structure's best bid and offer in the quote console of FIG. 5 being matched according to an embodiment.
Figure 8:
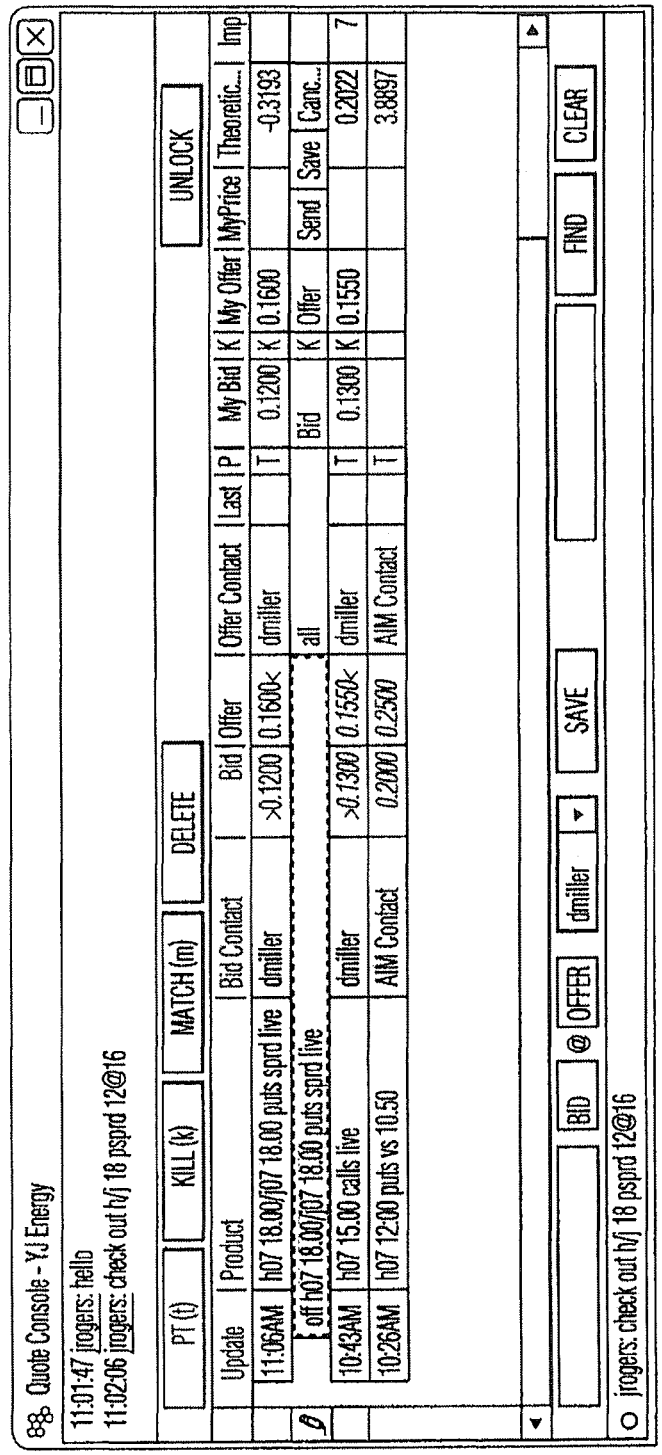
FIG. 8 is a screen shot showing an example of killing the user's bid or offer in the quote console of FIG. 5 according to an embodiment.
Figure 9:
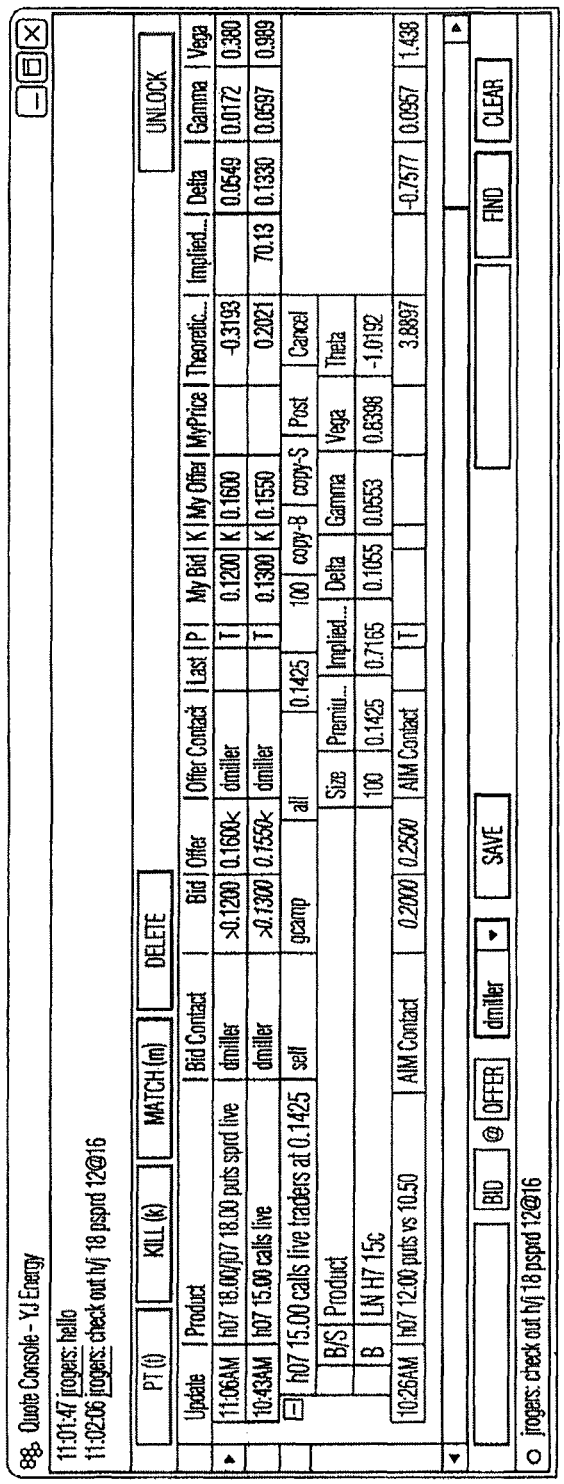
FIG. 9 is a screen shot showing an example of generating a trade entry in the quote console of FIG. 5 according to an embodiment.

FIG. 6 illustrates an example of a quote bid and/or offer being edited in the quote console. FIG. 7 illustrates an example of a quote bid and/or offer being matched using the quote console. FIG. 8 illustrates an example of killing a bid and/or offer using the quote console, and FIG. 9 illustrates an example of generating a trade entry using the quote console.

The quote console includes quotes of various users with a built-in capability of editing the bids and offers. In addition, bids may be matched and killed in the quote console. Finally, trade entries may be placed in the quote console.

Figure 10:
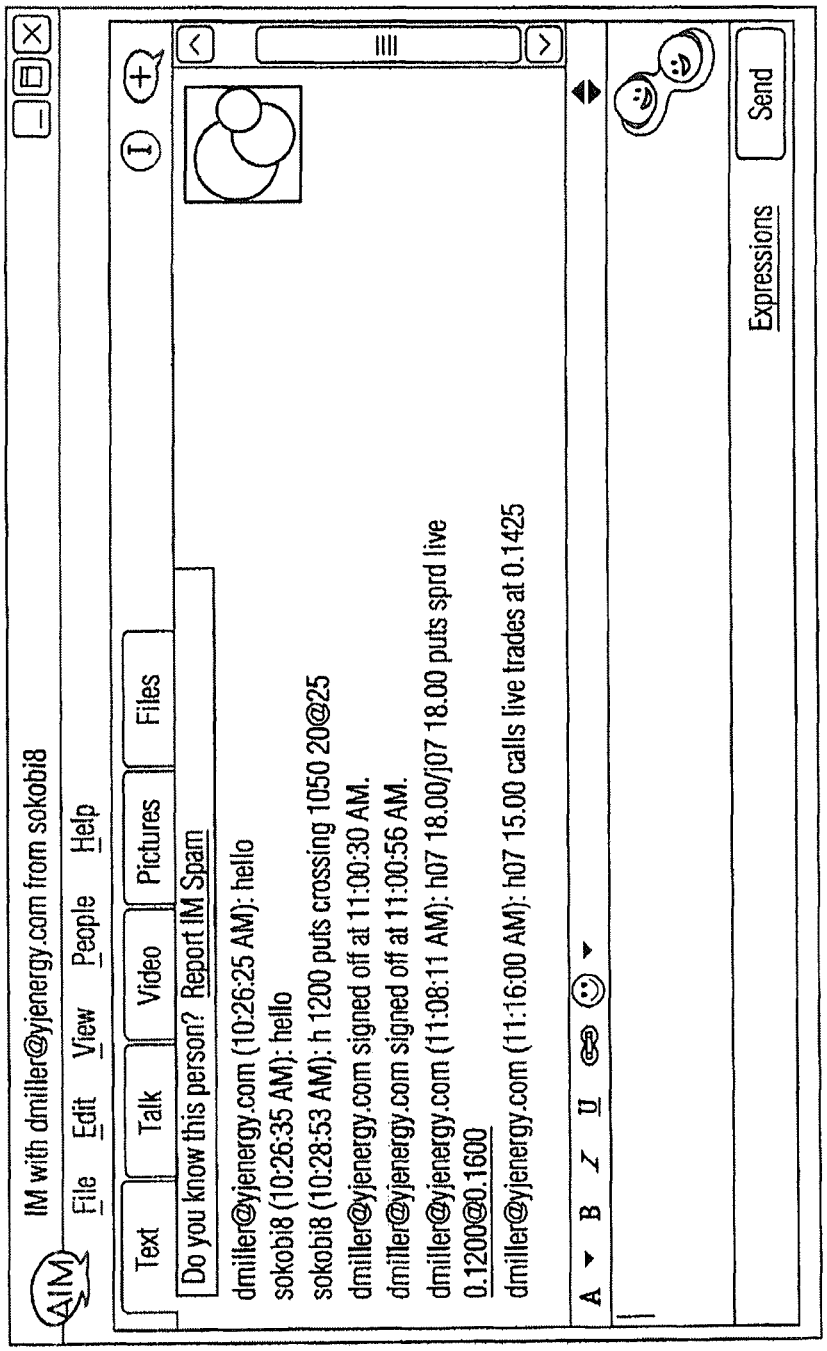
FIG. 10 is a screen shot of a non-user receiving a quote and trade entry data.

FIG. 10 shows an example of a non-user receiving a market update and a trade entry message generated via a quote console. This occurs because a user is communicating with a non-user. All parties involved in a communication do not have to be users.

Participants of OTC markets may share indications of interest (IOIs) with each other. The present disclosure provides technology that allows for efficient management of the accuracy and validity of all IOIs received by the user. A time is attached to each quote that is received by the user. As each quote ages it is pushed through an "expiration" lifecycle. The user may configure various levels of expiration, which have corresponding effects on the Quote Console and other user interface components. For example, in an embodiment of the present disclosure, the user may configure a Time-to-Italics (TTI). The TTI will mark older quotes in italic font in the Quote Console after a designated period of time and will also de-prioritize the quote with regards to other quotes. For example, assume a user receives an 18 bid at time 9:00 AM and a 17 bid at time 9:02 AM. Assume the user's TTI is set to 3 minutes. At time 9:01 AM the user's Quote Console will show the 18 bid as the best quote, however, at time 9:03 AM the user's Quote Console will show the 17 bid as the best quote (even though a bid of 18 is numerically better than a bid of 17) because the 18 bid has since reached its TTI.

The present disclosure also provides technology that allows for efficient management of the accuracy of all IOIs sent by the user. A time can be attached to each outgoing quote; as each outgoing quote ages it is pushed through an "expiration" lifecycle. The user may configure various levels of expiration, which have corresponding effects on the Quote Console, other user interface components, and outgoing messages. For example, in an embodiment of the present disclosure, the user may configure a Time-to-Live (TTL) for each quote. The TTL will automatically mark older quotes in italic font in the Quote Console and other user interface components. Finally, the TTL will also generate messages on-behalf-of the user to notify the original recipients of the price that the price is no longer accurate. For example, suppose UserA sends a price at 9:00 AM to UserB with a TTL of 4 minutes as follows: "×12 calls live 30 bid". In this example, the product is November 12 calls and the quote is a bid of 30. At 9:04 AM the quote will reach its TTL and a message will automatically be sent to UserB on-behalf-of UserA as follows: "out 12 calls live"; the pre-pended "out" text indicates that UserA's 30 bid is no longer accurate.

Figure 11A:
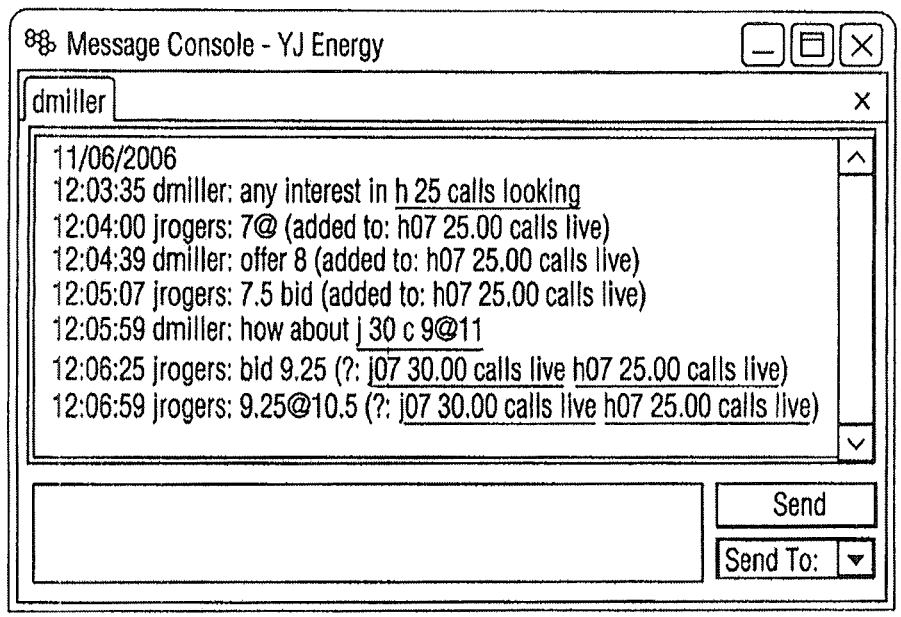
FIGS. 11A and 11B show a message console illustrating partial market data recognition.
Figure 11B:
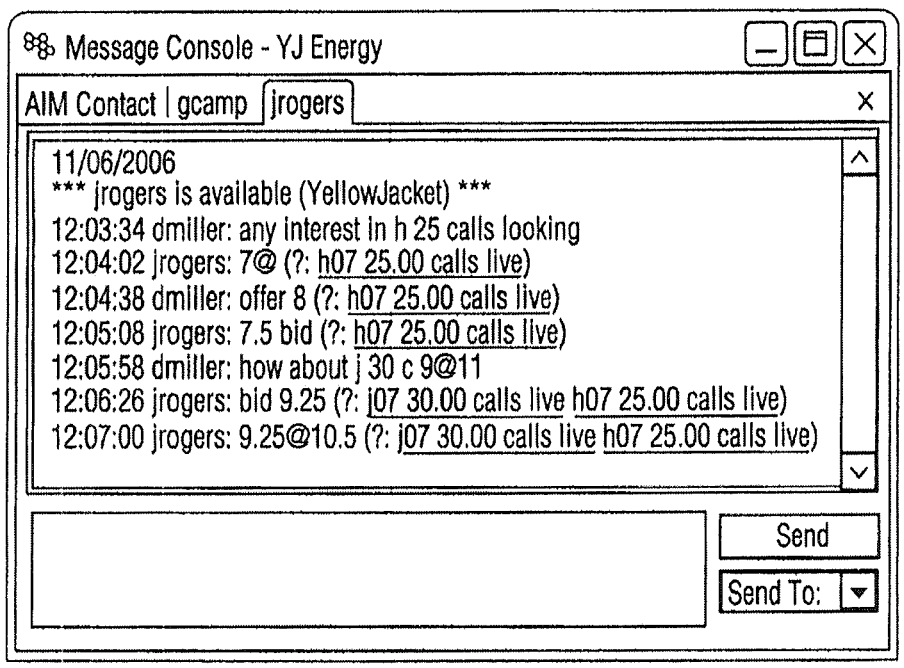

FIGS. 11A and 11B are examples of how the present disclosure recognizes and handles partial market data recognition. A partial quote consists of a bid and/or offer, but no associated structure. Here, in FIG. 11A, the messages are displayed as entered by the users. In FIG. 11B, a question mark is shown in places where the system may not know the association of the data. For example, the system may not know with which structure to associate the data. The system is able to recognize that this is relevant data, but just acts to ensure that a correct association is made rather than forming a baseless guess. This feature allows the methodology of the process to continue using the partial market data recognition. All actions do not come to a halt when portions of certain messages are not recognized by the MDR.

In one embodiment of the present disclosure, if product data is not recognized properly and/or is considered to be an invalid quote, it may be destroyed. However, even if destroyed, a copy of the original quote will always be preserved for later reference to determine whether or not the present disclosure acted correctly.

Essentially, partial market data recognition is designed to capture bid and offer information from text exchanges based on recent market context. For example, if a user sends or receives bid and/or offer information with no reference to which structure it pertains, the system will generate a list of markets associated with the counterparty based on recent market data history and based on user preferences, either automatically or with manual intervention, and will associate the bid and/or offer information with the appropriate market. This allows for rapid updating of bid and/or offer information either by the user or by counterparties.

Figure 12:
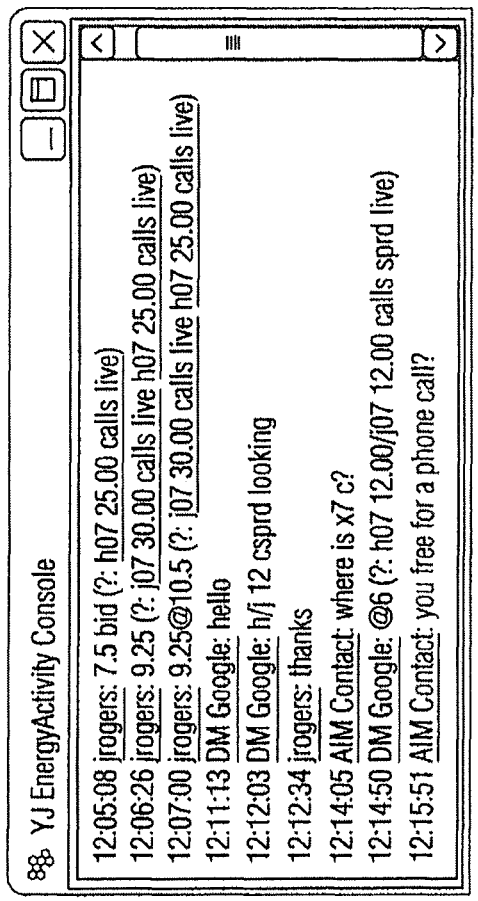
FIG. 12 illustrates an activity log in the activity console according to an exemplary embodiment.

FIG. 12 shows an example of the Activity Console according to an embodiment. The activity console is essentially an activity log, which provides a centralized, aggregate, real-time display of all incoming messages in chronological order. Messages in the Activity Console may be from users or non-users, from group or individual contacts, from an outside messaging server or an internal server, and may be part of a unicast or multicast message. The user has the option to reduce the aggregated messages to show only messages containing market data, or only messages containing trade data, or any other subgroup of the aggregated messages. The activity console can highlight when a message containing market data matches a custom user created alert.

In addition, a contact's communication window may be opened or activated from a link attached to the sender's name. This makes communication organized and time efficient. Also, the activity log may be filtered to display only markets, texts, trades, or other recognized markets in real-time. There are several different ways that the activity log may be filtered, including by users, by market data, by type of data being sent, by chronological order, by lineal order and so on.

FIG. 13 is an illustration and example of the pricing service feature. This feature may break down any structure to its component parts, a combination of futures, forwards, swaps, spreads, calls, puts, swaptions, or other products for pricing. Also, it may generate aggregate prices from legs. The Pricing Service Integration (PSI) typically is used to provide prices to other components. Another feature of the PSI is its ability to automatically price complex derivatives. Another feature of the PSI is the ability to allocate aggregate premiums to individual legs.

In one embodiment of the present disclosure, the PSI process begins with breaking down structures into component parts. All the derivatives, including fences, call spreads, straddles, etc. may be broken down into a combination of futures, forwards, swaps, spreads, calls, puts, swaptions or other products. The broken down structures are passed to a pricing service which is registered with the PSI component. The pricing service may price and re-price structures at any time and notify the PSI. The PSI passes pricing information into the market data bus. The pricing information may include one or more of the direct pricing support and the pricing support for the trade-entry, which is given a trade value. The direct pricing support provides an aggregate premium based on the user's pricing model. The pricing support for trade entry, which is given a trade value, includes premium allocation for each option based on several factors, some of which include a designated aggregate premium and sizes for swaps used to cross options. The user may plug-in a user defined pricing services.

The process for the breakdown is done to provide building blocks for mapping structure components for analyzing the exchange of contracts on derivatives. Pieces are analyzed to form a composite analysis. In addition, a different breakdown process may be implemented to accomplish mapping of the exchange components pieces to the relevant exchange products, for clearing, risk management, or other purposes.

In one embodiment, the process includes converting structures into a collection of clearable structure objects. This is a simple transformation to normalize various structure representations that typically involves wrapping a simple structure or each component in a basket structure with an implementation of the clearable structure interface that understands the structure or component. Another step in the process includes checking each clearable structure in the collection to make sure that it is clearable. Some structures are not possible to clear via the exchanges. Another step is to break down strips to individual months for each clearable structure in the collection, if it is cleared in that way. For each term, the clearable structure is converted into its component parts by the type of clearable structure.

Figure 14:
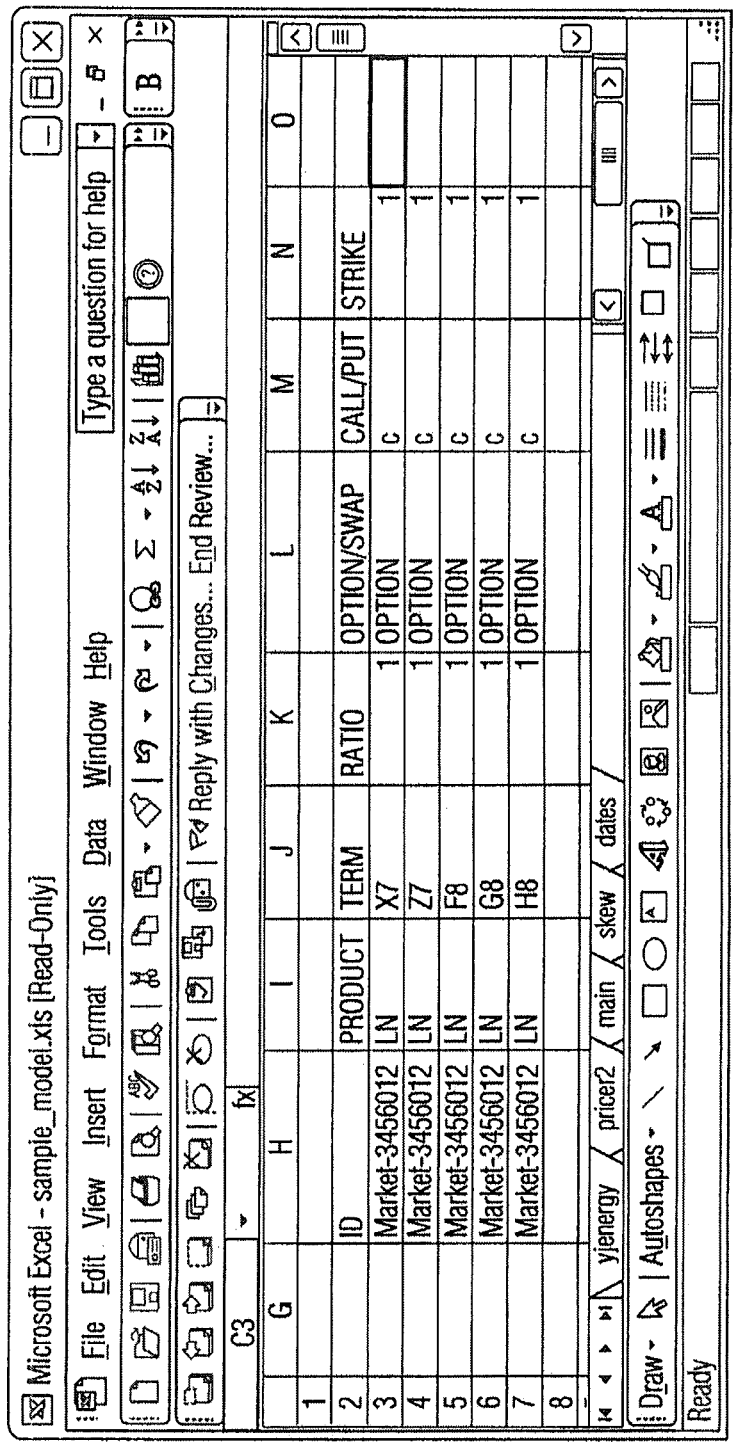
FIG. 14 illustrates the structure and quote data sent to a spreadsheet program according to an exemplary embodiment.
Figure 15:
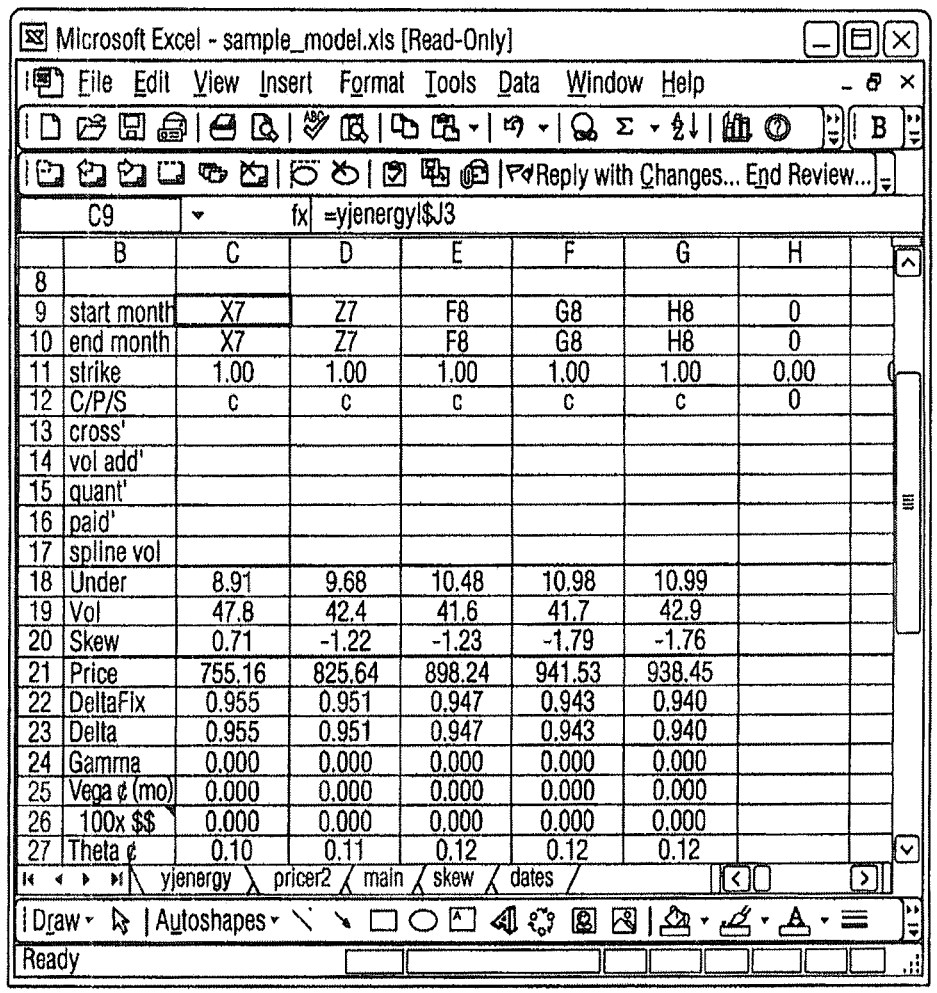
FIG. 15 illustrates a spreadsheet of the structure and quote data of FIG. 14 according to an exemplary embodiment.

FIG. 14 is an illustration of yet another feature that includes compiling and sending structure and quote data to a spreadsheet for easy access for the user. The spreadsheet in this example is an Excel™ spreadsheet, but any functional program may work. Here, the structure and its component parts are sent to the spreadsheet where a potential pricing service is implemented, as shown in FIG. 15. FIG. 15 is an illustration of a spreadsheet showing the model prices for structure legs.

The present disclosure also allows for users of the system to view all market activity on a consolidated real-time screen. This enables users to analyze data and respond to any opportunities as quickly as possible. Control is gained over portfolio valuation and end of the day mark-to-market price verification functions. Trade negotiations are conducted and logged in a manner that satisfies information technology and compliance requirements.

The present disclosure also allows for the sharing of incoming or outgoing messages, or extracting and sharing the data contained within incoming or outgoing messages across multiple users of the application. Raw incoming and outgoing messages may be shared, or a single IM address could be assigned to an entire group, where all users of the system in that organization may share that IM address and view all messages coming in or out of it. The present disclosure may also hide the identity of the user sending the message, so that counterparties only see the group IM address.

Additionally, the data contained within messages may be extracted and shared across multiple users in an organization. The Quote Console may be configured as a shared view, allowing users to combine the various structures, quotes and trades they've been messaged separately into one comprehensive view. Additionally, the combined view may update in real-time, as individual users receive quotes. The data contained in the combined view may be exported into various formats and provided to other consumers of the data, or archived into other systems.

The present disclosure utilizes various platforms for information exchange. One example of an information exchange platform is instant messaging (IM). Large amounts of data may be sent to or from counterparties using IM. Different parties, for example, traders and brokers, may have multiple counterparties and multiple streams of messages conducted over IM. The present disclosure is an information exchange platform, like IM, and market data organization, processing, and publishing application. The application can send and receive, but is not limited to, unstructured messages on behalf of a user.

The application may also parse and extract structure and quote data from those incoming and outgoing messages, and may make the structure and quote data available on a quote screen, pricing services and other APIs. The present disclosure may also extract data and input relevant data into another platform and into another format, like a spreadsheet. In addition, the application is operative with users and non-users, alike. All participants in the system of the present disclosure need not be users or subscribers. Analytical information derived from product data may be placed on the market data bus by the PSI. Such data may also be plotted against settlement or historical data. For example, real-time calculated volatilities may be plotted on a volatility surface described by volatilities from previous settlement data.

Another feature of the present disclosure is its ability to grant privileges to certain users and their associated groups. If a user is a member of a specific group, where the group has a plurality of user members, and privilege is granted to the plurality of members of the group, then the members of the group will have the ability to view any messages or interactions that any of the other members are engaged in per permission granted. For example, User 1 and User 2 are corresponding using instant messaging over a network. If User 1 is a member of Group 1, where the group includes a plurality of members with the privilege to view the instant messaging of User 1, then all of the members of Group 1 will have the capability to view the instant messages sent and received by User 1.

The present disclosure includes several market data consumers. Some of which include output to unstructured text, market data feed, quote consoles, pricing service integration, and several other plug-ins.

Data from each of the virtual user databases may be de-personalized and aggregated to create an aggregate market data feed. Each virtual user database contains historical information about each quoted structure. This data may come from instant messages containing structure and quote data or from structured communication of structure and quote data. This market data includes all quotes and trades known by the user organized by structure. Aggregate data may then be gathered from the virtual user databases. Data may be correlated based on product type (nat gas, crude, etc.), structure type (swap, call, straddle, etc.), etc. In this way, various types of aggregate reports may be run. An example of an aggregate report is a raw data report that includes all tick and trade data without reference to the user with which it is associated. Another example of an aggregate report is a swap settlement report that includes prices for all swaps based on the history of ticks and trades for a given day.

Another example of an aggregate report is an option settlement report that includes prices for all options with activity for a given day based on the history of ticks and trades for that option (including strike). Further, another example of an aggregate report is an option settlement calculator that includes, for each underlying product type, a swap forward curve and a volatility surface based on the ticks and trades for a given day. Yet another example of an aggregate report is a historical chart showing activity over time for various swaps and options.

The present disclosure also includes the process of placing market data on a bus and processing and pulling off the market data off of a bus. In addition, the present disclosure teaches the process of pulling market data out of unstructured text. The unstructured text could be generated and/or displayed anywhere, for example from IM.

The method of the present disclosure of publishing to and consuming from the market data feed is designed and structured to work off of any platform. An example of a platform that the present disclosure may be used for is the OTC processes, i.e., users publish quotes to easily definable groups of counterparties, using a combination of unstructured text and the outgoing market data feed to reach counterparties both off and on the network of the present disclosure.

The market data recognition generally parses unstructured text. This process includes generally the processing of all incoming and outgoing text, between users and non-users. In addition, the market data recognition module includes a quote entry panel on the quote console.

The system of the present disclosure provides an interface for quoting new structures to counterparties and to others. The interface provides a way to send error free quotes in a normalized format. In an embodiment, in order to enter a new quote, a user will type into an input box in freeform text. As the user types into the freeform textbox, the system parses the user's text in real time and creates a financial structure or combination of financial structures that reflects the structure that the user has typed.

The present disclosure also has a broking component. The broking component is an agent that acts as a broker. Users of the system may send quotes to a broking agent. The broking agent may distribute quotes using a broker specific distribution workflow. An example of a distribution workflow is a broker that automatically broadcasts all quotes. Other examples of distribution workflows are workflows where the broker agent distributes only a subset of quotes to a subset of users based on roles or other criteria at particular times, and may at a later time or times distribute a different subset of quotes to a different subset of users based on various criteria. In this way the agent can replicate existing business processes.

In an exemplary embodiment, a system according to the present disclosure includes one or more computer devices and one or more server computers in communication with the at least one computer devices. These computer devices sand server computers may comprise at least one of a personal computer, server, mobile communication device, smart phone, personal digital assistant (PDA), kiosk, automatic teller machine (ATM), wireless fidelity (WiFi) access point, gaming device, multi-media device, mobile entertainment device, cloud storage device, and database.

Each of the one or more computer devices may include at least one memory device, instructions stored in the memory device, and at least one processor executing the instructions. In one embodiment, the instructions may be configured to generate a user interface that receives unstructured text generated by a user. This unstructured text may comprise structures and quotes on structures, where each structure comprises one or more component parts (e.g., future, forward, swap, spread, option (e.g., call or put), option on a future, swaption and/or any other derivative instrument). In another embodiment, the one or more server computers may be configured to generate the aforementioned user interface, in which case the one or more computer devices may be configured for providing a gateway to the one or more server computers for accessing said user interface. In yet another embodiment, the one or more computer devices and one or more server computers may collaborate to collectively generate and provide access to the user interface.

Optionally, the user interface may be configured to create structures, manage quotes, disseminate quotes, analyze quotes and price structures, initiate trades, and communicate with other computer devices and the server computers in response to user input. In one embodiment, the user interface comprises a graphical interface that optionally comprises a product screen configured to display structure details and quote details related to each structure and quote available to a user; data entry fields configured for entering, editing, matching, and cancelling quotes; and a communications screen configured to communicate with one or more selected contacts, receive input comprising the unstructured text, and transmit the unstructured text to the one or more server computers. This communications screen may include an instant messaging screen, a text messaging screen, and/or a quote interface operable to input and define structures and quotes.

Included in the one or more server computers is at least one memory device storing code and at least one processor executing the code. In one embodiment, the code is configured to generate an instant messaging gateway that enables the one or more computer devices communicate with each other and with the server computers via instant messaging. In such an embodiment, the one or more server computers may be identified as instant messaging contacts of at least one of the computer devices, and configured to communicate with the computer device via the instant messages.

In another embodiment, the code is configured to generate a market data recognition module that recognizes the structures and quotes in the unstructured text and converts the unstructured text into an editable electronic order ticket that is pre-populated with data and information representing the structures and quotes. This market data recognition module may further be configured to convert the unstructured text into a selectable web link that is displayed via the user interface. Upon selecting web link, a web interface that includes the editable electronic order ticket may be launched. This web interface may be configured to receive user input including (without limitation) edits to order details included in the electronic order ticket, user preferences identifying one or more exchanges to which the electronic order ticket is transmitted for fulfillment, a confirmation that all order details included in the electronic order ticket are as desired, and a request to transmit the electronic order ticket to one or more exchanges for fulfillment. Notably, the one or more exchanges may comprise any combination of electronic and/or floor-based exchanges.

Upon transmitting the electronic order ticket to one or more exchanges for fulfillment, the one or more server computers may be configured to generate and transmit an instant message notice to one or more recipients associated with the one or more exchanges. Notably, the electronic order ticket may be submitted to the one or more exchanges according to user selected exchange preferences. Optionally, this instant message notice may include a selectable link that when selected launches an exchange interface that includes the electronic order ticket. Once launched, the exchange interface may be configured to receive input from the one or more recipients, said input including edits to the order details of electronic order ticket, a confirmation that all order details are as desired, and/or a request to transmit a fulfillment response to the initiator of the electronic order ticket.

In an embodiment, the system is configured to give recipients a predetermined period of time in which to respond to the instant message notice with offers to fulfill the electronic order ticket, such responses including at least one of a price and a quantity. This predetermined period may be referred to as an "auction period." At a conclusion of this predetermined auction period, the user interface may be configured to display all received recipient responses cumulatively, such that quantities of like-priced responses are summed and displayed as a single cumulative quantity associated with a single price.

Upon displaying the cumulative responses, the user interface may further be configured to provide a predetermined selection period during which the initiator of the electronic order ticket may provide input in the form of a selection of one or more of the responses. This selection may then initiate a trade at the selected response quantity and price combination. In one embodiment, if the selection includes a cumulative quantity that is higher than the quantity initially defined in the electronic order ticket, the initiator (by selecting the higher quantity) may initiate a trade for the higher quantity.

If after the auction period the electronic order ticket is not completely fulfilled, the system (e.g., the one or more server computers) may be configured to transmit the electronic order ticket to one or more different exchanges for fulfillment. As noted above, these additional exchanges may be selected according to user preferences, or they may be selected automatically by the system according to a liquidity of the exchanges, for example. As noted above, these exchanges may comprise one or more electronic and/or floor-based exchanges.

Once the electronic order ticket is completely fulfilled, the one or more server computers may optionally be configured to prevent (for a predetermined period of time) a second electronic order ticket comprising a same financial structure as the just-fulfilled order ticket from being transmitted to an exchange for fulfillment. For purposes of this disclosure, a "same" structure may be defined as one having a same directional option and stock leg combination.

Notably, if more than one recipient response is needed to fulfill the electronic order ticket, the one or more server computers may be configured to automatically allocate how responses will be used to fulfill the electronic order ticket. This automatic allocation may be according to the following criteria:

(i) price, where responses having a "best" price (from the initiator's perspective) will be used first, the "best" price being a lowest sell price (where the response is an offer to sell) or a highest purchase price (where the response is an offer to buy);

(ii) quantity; and (iii) response type, where non-contingent responses are allocated ahead of responses having one or more contingencies.

Further, if more than one response is allocated to fulfill the electronic order ticket, a single price may be applied to all such responses. Optionally, this single price may equal the highest sell price or the lowest purchase price of all of the responses used to fulfill the electronic order ticket. Thus, for example, if a first response includes a sell price of $0.12/unit and a second response includes a sell price of $0.14/unit, and both responses are needed to completely fulfill the electronic order ticket, the electronic order ticket will be filled at $0.14/unit which means the first respondent will receive more than his offer of $0.12/unit. This will incentivize recipients to respond with aggressively priced responses.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

The invention claimed is:

1. A computer device comprising:
one or more processors operatively coupled to a non-transitory memory storing computer-readable instructions that, when executed by the one or more processors, cause the computer device to:
receive, over a network, one or more unstructured plain text messages from a counterparty device;
generate an interactive graphical user interface (GUI) comprising a message console in a first window and a quote console in a second window;
display, in the first window, the one or more unstructured plain text messages in real-time as the one or more unstructured plain text messages are received;
parse one or more component parts corresponding to structure and quote data and indicative of a transaction from the one or more unstructured plain text messages by:
determining a deal status of the transaction using one or more of a history and an activity of the counterparty device stored in a database,
matching one or more strings of characters in the one or more unstructured plain text messages with a hierarchy of expressions, and
identifying the one or more component parts of the transaction based on the determination of the deal status and the matching;
automatically highlight, in the first window, the identified one or more component parts corresponding to the structure and quote data of the one or more unstructured plain text messages;
display, in the second window, the identified one or more component parts corresponding to the structure and quote data in a normalized standard format in real-time as the one or more unstructured plain text messages are received;
generate a selectable web link, the selectable web link configured to launch a web interface that includes an editable electronic order ticket;
display, in the first window, the selectable web link;
create, upon a selection of the selectable web link in the first window, the editable electronic order ticket, the editable electronic order ticket comprising the one or more component parts of the transaction parsed from the one or more unstructured plain text messages in real-time;
display, in a newly launched web interface, the editable electronic order ticket; and
transmit, via a network interface, the editable electronic order ticket to one or more exchanges for fulfillment.

2. The computer device of claim 1, wherein the one or more component parts comprise one or more of a future, forward, swap, spread, option, option on a future and swaption.

3. The computer device of claim 1, wherein the computer-readable instructions, when executed by the one or more processors, further cause the computer device to:
receive, by the interactive GUI, user input to create structures, manage quotes, disseminate quotes, analyze quotes and price structures, initiate trades, and communicate with the counterparty device.

4. The computer device of claim 1, wherein the first window comprises one or more of an instant messaging screen, a text messaging screen, and a quote interface operable to input and define structures and quotes.

5. The computer device of claim 1, wherein the second window comprises:
a product screen configured to display a quote associated with the transaction;
data entry fields configured for entering, editing, matching, and cancelling the quote; and
a communications screen configured to communicate with one or more selected contacts.

6. The computer device of claim 1, wherein the computer-readable instructions, when executed by the one or more processors, further cause the computer device to:
pair the one or more unstructured plain text messages with contextual information using at least the determined deal status, wherein identifying the one or more component parts of the transaction is based at least in part on the pairing.

7. The computer device of claim 1, wherein the web interface is configured to receive user input comprising one or more of:
edits to order details included in the editable electronic order ticket;
user preferences identifying one or more exchanges to which the editable electronic order ticket is transmitted for fulfillment, the one or more exchanges comprising one or more of an electronic exchange and a floor-based exchange;
a confirmation that all order details included in the editable electronic order ticket are as desired; and
a request to transmit the editable electronic order ticket to one or more exchanges for fulfillment.

8. The computer device of claim 7, wherein the computer-readable instructions, when executed by the one or more processors, further cause the computer device to:
generate an instant message notice comprising the selectable web link; and
transmit the instant message notice to one or more recipients associated with the one or more exchanges.

9. The computer device of claim 8, wherein the web interface is configured to receive input from the one or more recipients including one or more of edits to the order details of the editable electronic order ticket, a confirmation that all order details are as desired, and a request to transmit a fulfillment response to an initiator of the editable electronic order ticket.

10. The computer device of claim 8, wherein the one or more recipients have a predetermined period of time in which to respond to the instant message notice with offers to fulfill the editable electronic order ticket, the offers including one or more of a price and a quantity, and wherein at a conclusion of the predetermined period, the interactive GUI displays recipient responses cumulatively, such that quantities of responses within a predetermined price range are summed and displayed as a single cumulative quantity associated with a single price.

11. The computer device of claim 10, wherein the interactive GUI provides a predetermined selection period during which to receive user input comprising a selection of one or more of the responses to initiate a trade at a selected response quantity and price combination, wherein if the selection comprises a cumulative quantity that is higher than the quantity defined in the editable electronic order ticket, the selection initiates a trade for the higher quantity.

12. The computer device of claim 11, wherein if more than one response is needed to fulfill the editable electronic order ticket, the computer device is configured to automatically allocate how responses will be used to fulfill the editable electronic order ticket according to the following criteria:

(i) price, where responses having a best price will be used first, the best price comprising a lowest sell price or a highest purchase price;
(ii) quantity; and
(iii) response type, where non-contingent responses are allocated ahead of responses having one or more contingencies.

13. The computer device of claim 11, wherein if more than one response is needed to fulfill the editable electronic order ticket, a single price is applied to all such responses used to fulfill the editable electronic order ticket, the single price equaling a highest sell price or a lowest purchase price of all of the responses used to fulfill the editable electronic order ticket.

14. The computer device of claim 11, wherein the computer-readable instructions, when executed by the one or more processors, further cause the computer device to:

transmit the editable electronic order ticket to one or more different exchanges if the editable electronic order ticket is not completely fulfilled.

15. A method comprising:

receiving, by a computer device comprising one or more processors operatively coupled to a non-transitory memory storing computer-readable instructions, one or more unstructured plain text messages from a counterparty device over a network;

generating, by the computer device, an interactive graphical user interface (GUI) comprising a message console in a first window and a quote console in a second window;

displaying, by the computer device, the one or more unstructured plain text messages in the first window in real-time as the one or more unstructured plain text messages are received;

parsing, by the computer device, one or more component parts corresponding to structure and quote data and indicative of a transaction from the one or more unstructured plain text messages by:

determining a deal status of the transaction using one or more of a history and an activity of the counterparty device stored in a database, matching one or more strings of characters in the one or more unstructured plain text messages with a hierarchy of expressions, and identifying the one or more component parts of the transaction based on the determination of the deal status and the matching;

automatically highlighting, by the computer device, the identified one or more component parts corresponding to the structure and quote data of the one or more unstructured plain text messages in the first window;

displaying, by the computer device, in the second window, the identified one or more component parts corresponding to the structure and quote data in a normalized standard format in real-time as the one or more unstructured plain text messages are received;

generating, by the computer device, a selectable web link, the selectable web link configured to launch a web interface that includes an editable electronic order ticket;

displaying, by the computer device and in the first window, the selectable web link;

creating, by the computer device, upon a selection of the selectable web link in the first window, the editable electronic order ticket, the editable electronic order ticket comprising the one or more component parts of the transaction parsed from the one or more unstructured plain text messages in real-time;

displaying, by the computer device, in a newly launched web interface, the editable electronic order ticket; and transmitting, by the computer device, via a network interface, the editable electronic order ticket to one or more exchanges for fulfillment.

16. The method of claim 15, wherein the one or more component parts comprise one or more of a future, forward, swap, spread, option, option on a future and swaption.

17. The method of claim 15, further comprising:

receiving, by the computer device, user input to the interactive GUI to create structures, manage quotes, disseminate quotes, analyze quotes and price structures, initiate trades, and communicate with the counterparty device.

18. The method of claim 15, wherein the first window comprises one or more of an instant messaging screen, a text messaging screen, and a quote interface operable to input and define structures and quotes.

19. The method of claim 15, wherein the second window comprises:

a product screen configured to display a quote associated with the transaction;

data entry fields configured for entering, editing, matching, and cancelling the quote; and a communications screen configured to communicate with one or more selected contacts.

20. The method of claim 15, further comprising:

pairing the one or more unstructured plain text messages with contextual information using at least the determined deal status, wherein identifying the one or more component parts of the transaction is based at least in part on the pairing.

21. The method of claim 15, further comprising:

receiving, by the web interface, user input comprising one or more of:

edits to order details included in the editable electronic order ticket;

user preferences identifying one or more exchanges to which the editable electronic order ticket is transmitted for fulfillment, the one or more exchanges comprising one or more of an electronic exchange and a floor-based exchange;
a confirmation that all order details included in the editable electronic order ticket are as desired; and
a request to transmit the editable electronic order ticket to one or more exchanges for fulfillment.

22. The method of claim 21, further comprising:
generating, by the computer device, an instant message notice comprising the selectable web link; and
transmitting, by the computer device, the instant message notice to one or more recipients associated with the one or more exchanges.

23. The method of claim 22, wherein the web interface is configured to receive input from the one or more recipients including one or more of edits to the order details of the editable electronic order ticket, a confirmation that all order details are as desired, and a request to transmit a fulfillment response to an initiator of the editable electronic order ticket.

24. The method of claim 22, wherein the one or more recipients have a predetermined period of time in which to respond to the instant message notice with offers to fulfill the editable electronic order ticket, the offers including one or more of a price and a quantity,
wherein at a conclusion of the predetermined period, the interactive GUI displays recipient responses cumulatively, such that quantities of responses within a predetermined price range are summed and displayed as a single cumulative quantity associated with a single price.

25. The method of claim 24, wherein the interactive GUI provides a predetermined selection period during which to receive user input comprising a selection of one or more of the responses to initiate a trade at a selected response quantity and price combination,
wherein if the selection comprises a cumulative quantity that is higher than the quantity defined in the editable electronic order ticket, the selection initiates a trade for the higher quantity.

26. The method of claim 24, further comprising:
wherein if more than one response is needed to fulfill the editable electronic order ticket, automatically allocating, by the computer device, how responses will be used to fulfill the editable electronic order ticket according to the following criteria:
(i) price, where responses having a best price will be used first, the best price comprising a lowest sell price or a highest purchase price;
(ii) quantity; and
(iii) response type, where non-contingent responses are allocated ahead of responses having one or more contingencies.

27. The method of claim 24, further comprising:
wherein if more than one response is needed to fulfill the editable electronic order ticket, applying, by the computer device, a single price to all such responses used to fulfill the editable electronic order ticket, the single price equaling a highest sell price or a lowest purchase price of all of the responses used to fulfill the editable electronic order ticket.

28. The method of claim 24, further comprising:
transmitting, by the computer device, the editable electronic order ticket to one or more different exchanges if the editable electronic order ticket is not completely fulfilled.

* * * * *